United States Patent
Tsukada et al.

(10) Patent No.: US 7,146,629 B2
(45) Date of Patent: Dec. 5, 2006

(54) MULTI-USER TALKING SYSTEM AND MULTI-USER TALKING METHOD

(75) Inventors: Koji Tsukada, Tokyo (JP); Kenji Kawaguchi, Yokohama (JP); Osamu Takada, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 1046 days.

(21) Appl. No.: 09/987,589

(22) Filed: Nov. 15, 2001

(65) Prior Publication Data
US 2002/0057335 A1    May 16, 2002

(30) Foreign Application Priority Data
Nov. 15, 2000    (JP)    ............... 2000-348264

(51) Int. Cl.
*H04N 7/173* (2006.01)
(52) U.S. Cl. .................. 725/106; 725/110; 725/133; 348/14.01; 348/14.08; 348/14.09
(58) Field of Classification Search ............... 725/106, 725/110, 133
See application file for complete search history.

(56) References Cited

U.S. PATENT DOCUMENTS

| | | | |
|---|---|---|---|
| 6,195,680 B1* | 2/2001 | Goldszmidt et al. | 709/203 |
| 6,339,842 B1* | 1/2002 | Fernandez et al. | 725/133 |
| 6,590,602 B1* | 7/2003 | Fernandez et al. | 348/14.08 |
| 6,889,385 B1* | 5/2005 | Rakib et al. | 725/119 |
| 2002/0007490 A1* | 1/2002 | Jeffery | 725/78 |
| 2004/0117831 A1* | 6/2004 | Ellis et al. | 725/53 |
| 2005/0262542 A1* | 11/2005 | DeWeese et al. | 725/106 |

OTHER PUBLICATIONS

Sony Drive, Do you dream in Sony, Oct. 31, 2000, (Translation attached).

* cited by examiner

*Primary Examiner*—Chris Kelley
*Assistant Examiner*—Farzana E. Hossain
(74) *Attorney, Agent, or Firm*—Mattingly, Stanger, Malur & Brundidge, P.C.

(57) ABSTRACT

Out of viewers of the same content, multi-user talking service is provided to only viewers who wish to enjoy the content in a large number of people. Only when an address of a terminal 4, 5 that has transmitted a request for participation in multi-user talking is registered in a viewer management DB (which manages viewers of contents), a content distribution/multi-user talking service center 1 registers the above-mentioned address into a participant management DB (which manages participants in multi-user talking) associating the address with identification information of a content that is registered in association with the address in question in the viewer management DB. Then, for each content, respective pieces of talking data received from addresses registered in association with identification information of said content in the participant management DB are synthesized to generate multi-user talking data, and generated multi-user talking data is transmitted to each of said addresses.

4 Claims, 15 Drawing Sheets

FIG.3

REGISTRATION MANAGEMENT DB 17

| REGISTRATION NO 171 | IDENTIFICATION INFORMATION 172 | | PRIVATE INFORMATION 173 | ACCOUNTING INFORMATION 174 |
|---|---|---|---|---|
| | USER NAME | PASSWORD | | |
| 0001 | ABC | x54781 | ◎ × | ¥**** |
| 0002 | XYZ | z74z12 | △ × | ¥**** |
| ⋮ | ⋮ | ⋮ | ⋮ | ⋮ |

FIG.4

VIEWER MANAGEMENT DB 133

| CHANNEL NO 1351 | REGISTRATION NO 171 | ADDRESS 1331 | |
|---|---|---|---|
| | | IP ADDRESS | TELEPHONE NO |
| 0001 | 0002 | ****** | |
| | 0005 | | ***** |
| | ⋮ | ⋮ | ⋮ |
| 0002 | 0012 | ****** | |
| | ⋮ | ⋮ | ⋮ |

FIG.5

CONTENT DB 135

| CHANNEL NO (1351) | CONTENT DATA (1353) | DESCRAMBLE KEY (1354) |
|---|---|---|
| 001 | ****** | 001 |
| 002 | ****** | 002 |
| ⋮ | ⋮ | ⋮ |

FIG.6

PARTICIPANT MANAGEMENT DB 143

| CHANNEL NO (1351) | REGISTRATION NO (171) | ADDRESS (1331) | | TELEPHONE NO (1352) |
|---|---|---|---|---|
| | | IP ADDRESS | TELEPHONE NO | |
| 0001 | 0002 | ****** | | |
| | 0009 | | ***** | ***** |
| | ⋮ | ⋮ | ⋮ | ⋮ |
| 0002 | 0019 | ****** | | |
| | ⋮ | ⋮ | ⋮ | ⋮ |

RECEIVING TERMINAL 5

CONTENT RELAY APPARATUS 3

FIG.11

RELAY INFORMATION DB 25

| CHANNEL NO /1351 | TELEPHONE NUMBER INFORMED /1352 |
|---|---|
| 0001 | **** |
| 0002 | **** |
|  | **** |
| ⋮ | ⋮ |

MULTI-USER TALKING SYSTEM AND MULTI-USER TALKING METHOD

BACKGROUND OF THE INVENTION

The present invention relates to a multi-user talking service, and particularly to a technique for providing a multi-user talking service among viewers who views a same content through a network.

Recently, there have been proposed content distribution services that distribute various contents through a network such as the Internet. Examples of content distribution services include a movie distribution service and a karaoke music distribution service. A user of such a content distribution service can enjoy a movie or karaoke at his home, without going to a movie theater or a karaoke house. Further, a portable terminal such as a PDA may be used to enjoy a movie or karaoke at a place where a user is staying.

SUMMARY OF THE INVENTION

Among contents, there are contents that a group of persons enjoy more than a lonely person. For example, usually, a comedy movie becomes more enjoyable when many persons see it together. Also, karaoke is more enjoyable for a group. On the other hand, there are movies that a person wishes to see intently by himself. And, sometimes a person wishes to practice karaoke by himself. The conventional content distribution services have not considered such things at all.

As a system for realizing a multi-user talking system, a TV conference system may be mentioned. However, the TV conference system premises that all the persons who participate in a conference (i.e., all the persons who view the respective TVs) participate in multi-user talking. In other words, it is not supposed that, among viewers seeing or hearing a same content through a content distribution service, there are intermingled persons who wish to enjoy the content in a group talking with many persons about the content and persons who each wish to intently enjoy the content by himself.

Further, the TV conference system premises that all the persons participating in a conference use TV conference terminals having a same interface. Thus, it is impossible to provide a multi-user talking service between terminals having different interfaces, for example, between a terminal provided with an interface with an IP network and a terminal provided with an interface with a telephone network.

The present invention has been completed taking the above-described conditions into consideration. And, an object of the present invention is to provide a multi-user talking service only for viewers who wish to enjoy a content in a group, among viewers who view the same content through a content distribution service.

Further, another object of the present invention is to provide a multi-user talking service between terminals having different interfaces, for each viewer who views a same content through a content distribution service.

To attain the above objects, the present invention uses a content distribution apparatus and a multi-user talking control apparatus, each connected to terminals of viewers through a network, to provide a multi-user talking service among viewers of content.

The above-mentioned content distribution apparatus comprises: a request-for-viewing receiving means for receiving a request for viewing said content from a terminal of a viewer; a viewer management means for managing a request for viewing received by said request-for-viewing receiving means, associating said request with a transmission source address of said request for viewing; and a content distribution means for distributing said content to a transmission source address managed by said viewer management means.

Further, the above-mentioned multi-user talking control apparatus comprises: a request-for-participation receiving means for receiving a request for participation in multi-user talking, from a terminal of a viewer; a participant management means that manages a transmission source address of a request for participation received by said request-for-participation receiving means, when said transmission source address is managed by said viewer management means; a mixing means that receives respective pieces of talking data from terminals of viewers who have transmission source addresses managed by said participant management means, and mixes said pieces of talking data received to generate multi-user talking data; and a multi-user talking data distribution means for distributing the multi-user talking data generated by said mixing means to transmission source addresses managed by said participant management means.

Here, for example, an IP (Internet Protocol) network may be used as the above-mentioned network. In that case, it is favorable that the above-mentioned content distribution means converts said content into IP packets, and adds transmission source addresses (IP addresses) managed by said viewer management means to multicast the IP packets onto said IP network. Further, it is favorable that the above-mentioned multi-user talking data distribution means converts the multi-user talking data generated by said mixing means into IP packets, adds transmission source addresses (IP addresses) managed by said participant management means to a header of each IP packet, and multicasts the IP packets onto said IP network. As a sound talking service using an IP network, VoIP (Voice over IP) technique is known.

According to the present invention, when an address of a viewer's terminal that transmits a request for participation in multi-user talking is a viewer's terminal that has transmitted a request for viewing a content, then, the viewer's terminal in question is permitted to participate in the multi-user talking. Thus, it is possible to provide a multi-user talking service only to viewers who have transmitted their requests for participation to the multi-user talking control apparatus, among viewers of the same content provided from the content distribution apparatus.

Further, in the present invention, the above-mentioned multi-user talking control apparatus may further comprise: a request-for-appeal-for-participation receiving means for receiving a request for appeal for participation in multi-user talking, from a terminal of a viewer; and an appeal-for-participation means that distributes an appeal for participation in multi-user talking to terminals of viewers who have respective transmission source addresses other than transmission source addresses managed by said participant management means, among transmission source addresses managed by said viewer management means, when a transmission source address of the request for appeal for participation received by said request-for-appeal-for-participation receiving means is a transmission source address managed by said participant management means, and receives respective answers to said appeal for participation, from the terminals of said viewers. And, when an answer to said appeal for participation received by said appeal-for-participation means indicates intention of participating, said participant management means manages a transmission source address of said answer.

By this, a participant in multi-user talking can appeal for participation in the multi-user talking to persons who are viewers of the content which the participant is viewing and who is not participating in the multi-user talking. By this, it is possible to enjoy the content provided from the content distribution apparatus, talking about the same content with more participants in the multi-user talking.

Further, in the present invention, when the above-mentioned network is an IP network, and, as the above-mentioned viewer's terminal, there exist a terminal (a first terminal) provided with an interface with said IP network and a terminal (a second terminal) provided with not an interface with said IP network but an interface with a telephone network and a television broadcast receiving function, then, it is favorable to further provide a first relay apparatus for relaying data between the IP network and the television broadcast, and a second relay apparatus for relaying data between the IP network and the telephone network.

Here, the above-mentioned first relay apparatus assembles IP packets addressed to itself, to restore a content, and broadcasts the restored content. Further, the above-mentioned second relay apparatus assembles IP packets addressed to itself, to restore multi-user talking data, and transmits the restored multi-user talking data to a channel specified by a telephone number informed from the multi-user talking control apparatus, and on the other hand, converts talking data received from the above-mentioned channel into IP packets, and transmits the IP packets to the multi-user talking control apparatus.

Then, said request-for-viewing receiving means receives a request for viewing the content from the first terminal through the IP network, and a request for viewing from the second terminal through the telephone network.

Further, said viewer management means sets a transmission source address associated with a request for viewing received by said request-for-viewing receiving means, to an IP address of a transmission source of said request for viewing, when said request for viewing is received through the IP network, and to a telephone number of the transmission source of said request for viewing, when said request for viewing is received through said telephone network.

Further, said content distribution means uses an IP address of said first relay apparatus, as a transmission source address added to a header of each IP packet of said content, in place of a telephone number included in the transmission source addresses managed by said viewer management means, when such a telephone number exists.

Further, said request-for-participation receiving means receives a request for participation from the above-mentioned first terminal through said IP network; and receives a request for participation including a telephone number (for example, a telephone number of a portable telephone) from the above-mentioned second terminal through said telephone network.

Further, said participant management means sets a transmission source address associated with a request for participation received by said request-for-participation receiving means, to an IP address of a transmission source of said request for participation, when said request for participation is received through said IP network, and to a telephone number of the transmission source of said request for participation, when said request for participation is received through said telephone network.

Further, said mixing means receives pieces of talking data from viewer's terminals each having an IP address managed by said participant management means and from said second relay apparatus, when a telephone number is included in transmission source addresses managed by said participant management means, and mixes the received pieces of talking data to generate multi-user talking data.

Further, said multi-user talking data distribution means uses an IP address of said second relay apparatus, as an address added to a header of each IP packet of the multi-user talking data, in place of a telephone number included in the transmission source addresses managed by said participant management means, when such a telephone number exists. Further, said viewer management means informs the second relay apparatus of a telephone number included in a request for participation having said telephone number as its transmission source address.

By this, it is possible to provide a multi-user talking service, while the same content is viewed by a first terminal provided with an interface with an IP network, and a second terminal provided with not an interface with an IP network but an interface with a telephone network and a television broadcast receiving function.

BRIEF DESCRIPTION OF THE DRAWINGS

FIG. 3 is a diagram showing an example of registered contents of the registration management database 17 shown in FIG. 2;

FIG. 4 is a diagram showing an example of registered contents of the viewer management database 133 shown in FIG. 2;

FIG. 5 is a diagram showing an example of registered contents of the content database 135 shown in FIG. 2;

FIG. 6 is a diagram showing an example of registered contents of the participant management database 143 shown in FIG. 2;

FIG. 11 is a diagram showing an example of registered contents of the relay information database 25 shown in FIG. 10;

DETAILED DESCRIPTION OF THE PREFERRED EMBODIMENTS

In the following, one embodiment of the present invention will be described.

Figure 1:
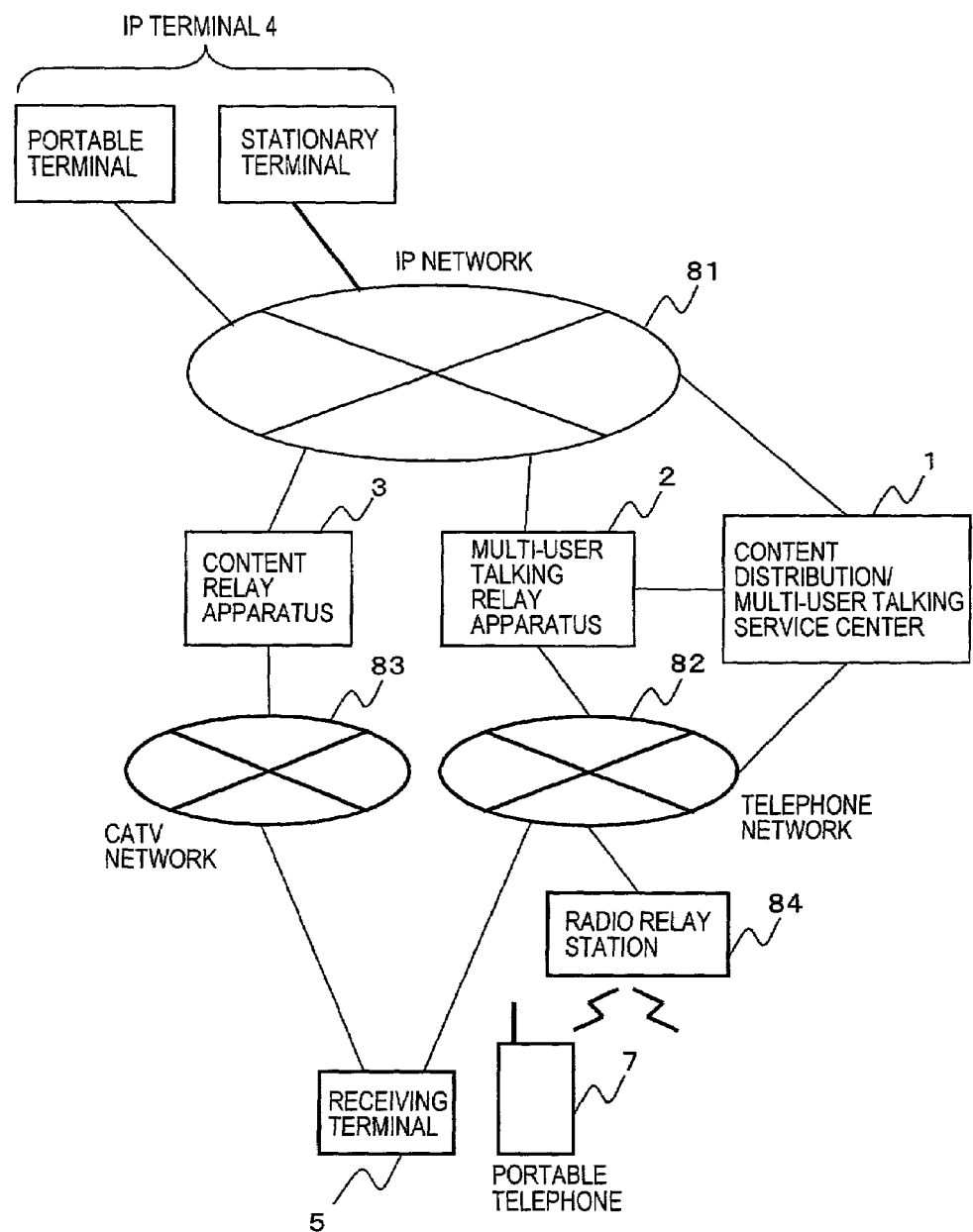
FIG. 1 is a schematic block diagram showing a multi-user talking system to which one embodiment of the present invention is applied.

FIG. 1 is a schematic block diagram showing a multi-user talking system to which one embodiment of the present invention is applied.

As shown in the figure, the multi-user talking system of the present embodiment comprises:

a content distribution/multi-user talking service center 1 that provides a content distribution service and a multi-user talking service utilizing the VoIP (Voice over IP) technique;

IP terminals 4, such as a stationary terminal (for example, a PC (personal computer)) and a portable terminal (for example, a PDA (personal digital assistant)), for enjoying the content distribution service and the multi-user talking service provided through an IP (Internet Protocol) network 81 by the content distribution/multi-user talking service center 1;

a receiving terminal 5, such as an STB (Set Top Box), for enjoying the content distribution service through a CATV (Cable Television) network 83 by the content distribution/multi-user talking service center 1;

a portable telephone 7;

a content relay apparatus 3 for relaying data (content data) between the IP network 81 and the CATV network 83; and a multi-user talking relay apparatus 2 for relaying data (multi-user talking data) between the IP network 81 and a telephone network 82.

The portable telephone 7 is a telephone used by an operator of the receiving terminal 5 when he or she enjoys the multi-user talking service provided by the content distribution/multi-user talking service center 1 through the telephone network 82. Here is illustrated an example of a radiotelephone connected to the telephone network 82 through a wireless relay station 84. However, it does not matter to use an ordinary wire telephone connected directly to the telephone network 82.

The content distribution/multi-user talking service center 1 receives a request for viewing a content from an IP terminal 4 through the IP network 81, and receives a request for viewing a content from the receiving terminal 5 through the telephone network 82. The content distribution/multi-user talking service center 1 provides content data of a request content with a channel number (identification information) of the content, and converts the data into IP packets. Then, the content distribution/multi-user talking service center 1 adds an address (IP address) of each terminal that has transmitted a request for viewing the content in question, to a header of each IP address, and multicasts the packets on the IP network 81. At that time, when a request for viewing the content is received from the receiving terminal 5 through the telephone network 82, then, instead of the telephone number of the receiving terminal 5, the IP address of the content relay 3 apparatus is used as the above-mentioned address added to the header of each IP address.

Further, the content distribution/multi-user talking service center 1 receives a request for participation in multi-user talking from an IP terminal 4 through the IP network 81, and receives a request for participation in multi-user talking from the receiving terminal 5 through the telephone network 82. Then, the content distribution/multi-user talking service center 1 receives IP packets, which store talking data, through the IP network 81 from each terminal that has transmitted a request for participation in multi-user talking, and assembles the received IP packets to restore the talking data. Next, pieces of received talking data are synthesized for each channel number of content, which is added to the talking data concerned, to generate multi-user talking data. Then, the channel number, which has been added to pieces of talking data, i.e., sources of the generated multi-user talking data, is given to the generated multi-user talking data in question, before forming the multi-user talking data into IP packets. Further, an address (IP address) of each terminal that has transmitted a request for viewing the content of the above-mentioned channel number and transmitted a request for participation in multi-user talking is added to a header of each IP address, and the packets are multicast on the IP network 81.

At that time, when a request for participation in multi-user talking is received from the receiving terminal 5 through the telephone network 82, then, IP packets that store talking data are received through the IP network 81 from each terminal that has transmitted a request for participation or the multi-user talking relay apparatus 2, and assembles the received IP packets to restore the talking data. Further, instead of the telephone number of the receiving terminal 5, the IP address of the multi-user talking relay apparatus 2 is used as the address added to the header of each IP address.

Furthermore, the content distribution/multi-user talking service center 1 receives a request for appeal for participation in multi-user talking, from an IP terminal 4 through the IP network 81, and receives a request for appeal for participation in multi-user talking, from the receiving terminal 5 through the telephone network 82. Then, the content distribution/multi-user talking service center 1 appeals to the other terminals 4, 5 than the terminal 4, 5 that has transmitted a request for appeal for participation, to participate in multi-user talking.

An IP terminal 4 transmits a request for viewing, which includes identification information of an operator of the IP terminal 4 and a channel number of a content that the operator wishes to view, to the content distribution/multi-user talking service center 1 through the IP network 81. Then, the IP terminal 4 receives the content data of the channel number in question, which is sent from the content distribution/multi-user talking service center 1 through the IP network 81, and displays the received content data.

Further, an IP terminal 4 transmits a request for participation in multi-user talking relating to the content that the IP terminal 4 is receiving, to the content distribution/multi-user talking service center 1 through the IP network 81, to enjoy multi-user talking service among the viewers of the same content. In detail, an IP terminal 4 gives a channel number of the content that the IP terminal 4 is receiving to talking data of the operator of the IP terminal 4, and transmits the resultant data to the content distribution/multi-user talking service center 1 through the IP network 8. Further, an IP terminal 4 receives multi-user talking data added with the channel number of the content that the IP terminal 4 is receiving, from the content distribution/multi-user talking service center 1 through the IP network 81, and outputs the received data. By this, the IP terminal 4 enjoys multi-user talking service among viewers of the same content.

Further, an IP terminal 4 transmits a request for appeal for participation in multi-user talking to the content distribution/multi-user talking service center 1 through the IP network 81, so that the content distribution/multi-user talking service center 1 appeals to viewers of the content that the IP terminal 4 is receiving to participate in multi-user talking.

The receiving terminal 5 transmits a request for viewing, which includes identification information of the operator of the receiving terminal 5 and a channel number of a content that the operator wishes to view, to the content distribution/multi-user talking service center 1 through the telephone network 82. Then, the receiving terminal 5 receives the content of the channel number in question sent from the content distribution/multi-user talking service center 1 through the IP network 81, the content relay apparatus 3 and the CATV network 83, and displays the received content on a display unit such as a monitor.

Further, the receiving terminal 5 transmits a request for participation in multi-user talking relating to the content that the receiving terminal 5 is receiving to the content distribution/multi-user talking service center 1 through the telephone network 82, to enjoy multi-user talking among viewers of the same content. The above-mentioned request includes the telephone number of the portable telephone 7 used by the operator of the receiving terminal 5 for multi-user talking. In detail, the portable telephone 7 used by the operator of the receiving terminal 5 transmits talking data to the content distribution/multi-user talking service center 1 through the telephone network 82, the multi-user talking relay apparatus 2 and the IP network 81. Further, the above-mentioned portable telephone 7 receives multi-user talking data from the content distribution/multi-user talking service center 1 through the IP network 81, the multi-user talking relay apparatus 2 and the telephone network 82, and outputs the received data. By this, multi-user talking service among viewers of the same content is enjoyed.

Further, the receiving terminal 5 transmits a request for participation in multi-user talking to the content distribution/multi-user talking service center 1 through the telephone network 82, so that the content distribution/multi-user talking service center 1 appeals to viewers of the content that the receiving terminal 5 is receiving, to participate in multi-user talking.

The content relay apparatus 3 obtains IP packets addressed to itself from the IP network 81, and assembles the obtained packets to restore the content data. Then, the content relay apparatus 3 scrambles the restored content data with a scramble key prepared in advance in association with a channel number given to the content data in question, and transmits the scrambled content data onto the CATV network 83.

The multi-user talking relay apparatus 2 receives talking data from the portable telephone 7 through the telephone network 82, provides the received data with a channel number of a content, which is informed in association with the telephone number of the portable telephone 7 from the content distribution/multi-user talking service center 1, and converts the received data into IP packets. Then, the multi-user talking relay apparatus 2 transmits each IP packet to the content distribution/multi-user talking service center 1. Further, the multi-user talking relay apparatus 2 obtains IP packets addressed to itself from the IP network 81, and assembles the received packets to restore multi-user talking data. Then, the multi-user talking relay apparatus 2 extracts a channel number of a content, from the restored multi-user talking data, and transmits the restored data to the portable telephone 7 of the telephone number that is informed in association with the channel number in question from the content distribution/multi-user talking service center 1.

Next, will be described each component apparatus in the multi-user talking system having the above-described configuration.

Here, the portable telephone 7 and the radio relay station 84 are similar to the conventional ones, and their descriptions will be omitted.

First, the content distribution/multi-user talking service center 1 will be described.

Figure 2:
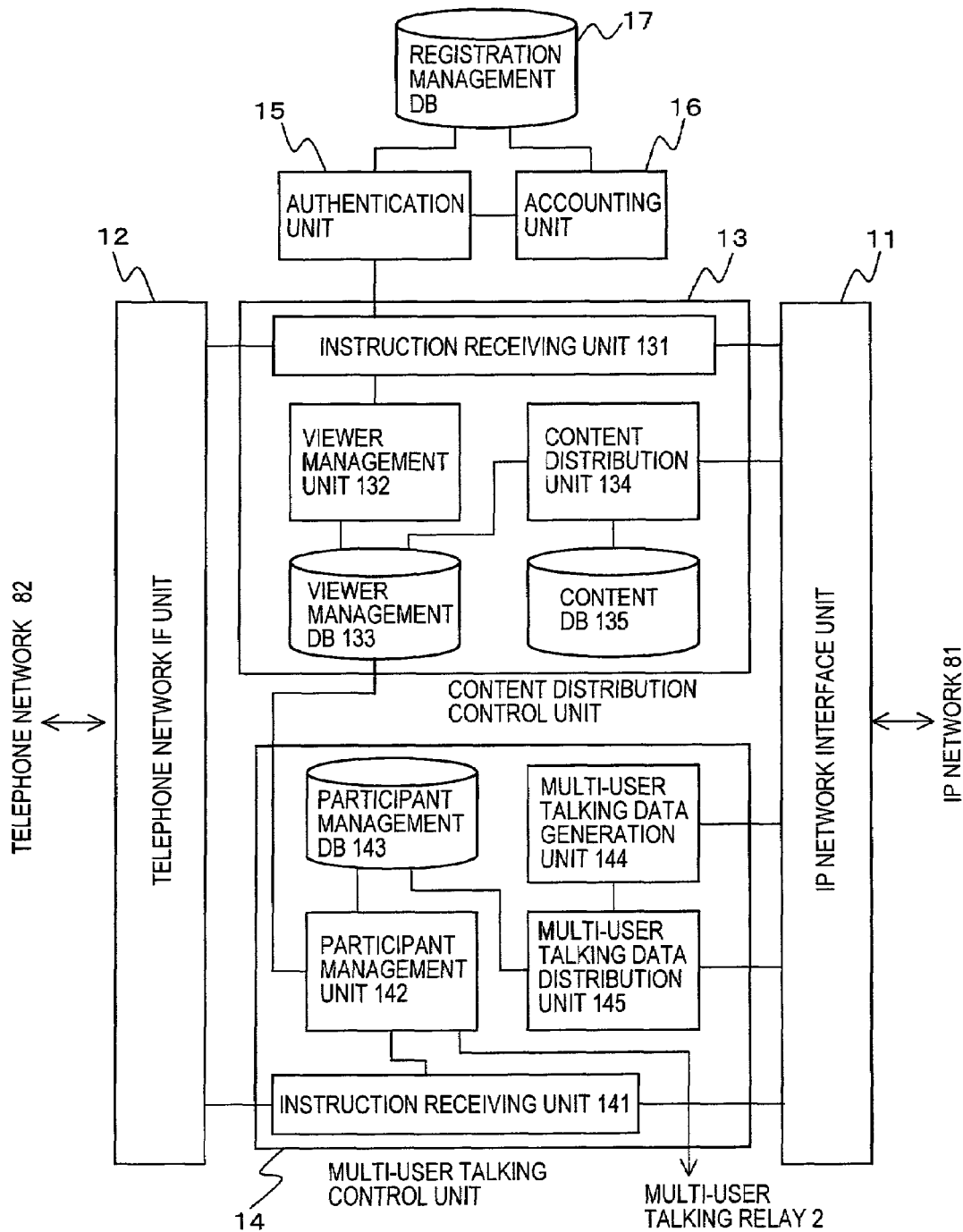
FIG. 2 is a schematic block diagram showing the content distribution/multi-user talking service center 1 shown in FIG. 1.

FIG. 2 is a schematic block diagram showing the content distribution/multi-user talking service center 1.

As shown in the figure, the content distribution/multi-user talking service center 1 comprises: an IP network interface unit 11 for communicating with another apparatus through the IP network 81; a telephone network interface unit 12 for communicating with another apparatus through the telephone network 82; a registration management database 17; an authentication unit 15; an accounting unit 16; a content distribution control unit 13; and a multi-user talking control unit 14.

The IP network interface unit 11 relays between the IP network 81 and the content distribution control unit 13.

In detail, the IP network interface unit 11 obtains IP packets addressed to itself from the IP network 81, and assembles the obtained packets to restore data. When the restored data is a request for viewing a content, then, the IP network interface unit 11 informs the below-described instruction receiving unit 131 of the request in question together with a transmission source address of the request. Further, the IP network interface unit 11 converts information received from the instruction receiving unit 131 into IP packets, and adds an IP address, which is received together with the information in question from the instruction receiving unit 131, to a header of each IP packet, before distributing the IP packets onto the IP network 81. Further, the IP network interface unit 11 receives content data, which is added with a channel number of the content, from the below-described content distribution unit 134, and converts the received content data into IP packets. Then, the IP network interface unit 11 adds an IP address, which is received together with the content data in question from the content distribution unit 134, to a header of each IP packet, before multicasting the IP packets on the IP network 81.

Further, the IP network interface unit 11 relays between the IP network 81 and the multi-user talking control unit 14.

In detail, the IP network interface unit 11 obtains IP packets addressed to itself from the IP network 81, and assembles the obtained IP packets to restore data. When the restored data is a request for participation or a request for appeal for participation in multi-user talking, then, the IP network interface unit 11 informs the below-described instruction receiving unit 141 of the request together with a transmission source address of the request. Further, the IP network interface unit 11 converts information received from the instruction receiving unit 141 into IP packets, and adds an IP address, which is received together with the information in question from the instruction receiving unit 141, to a header of each IP packet, before distributing the IP packets onto the IP network 81. When the restored data is talking data, then, the IP network interface unit 11 sends the talking data to the below-described multi-user talking data generation unit 144. Further, the IP network interface unit 11 receives multi-user talking data, which is added with a channel number of a content, from the below-described multi-user talking data distribution unit 145, and converts the received multi-user talking data into IP packets. Then, the IP network interface unit 11 adds an IP address, which is received together with the multi-user talking data in question from the multi-user talking data distribution unit 145, to a header of each IP packet, before multicasting the IP packets on the IP network 81.

The telephone network interface unit 12 relays between the telephone network 82 and the content distribution control unit 13.

In detail, the telephone network interface unit 12 receives a request for viewing a content from the receiving terminal 5 through a channel established on the telephone network 82 by responding to an arrival from the receiving terminal 5. And, the telephone network interface unit 12 informs the instruction receiving unit 131 of the received request together with a sender's number (telephone number of the receiving terminal 5). Further, the telephone network interface unit 12 transmits information received as an answer to the request in question from the instruction receiving unit 131, to the receiving terminal 5 through the above-mentioned channel.

Further, the telephone network interface unit 12 relays between the telephone network 82 and the multi-user talking control unit 14.

In detail, the telephone network interface unit 12 receives a request for participation or a request for appeal for participation in multi-user talking from the receiving terminal 5 through a channel established on the telephone network 82, by responding to an arrival from the receiving terminal 5, and informs the instruction receiving unit 141 of the request in question together with the sender's number (telephone number of the receiving terminal 5). Further, the telephone network interface unit 12 transmits information received as an answer to the request question from the instruction receiving unit 141, to the receiving terminal 5 through the above-mentioned channel. Further, the telephone network interface unit 12 receives the telephone number together with appeal-for-participation information for appealing for participation in multi-user talking, from the instruction receiving unit 141, and calls the receiving terminal 5 specified by the received telephone number, to establish a channel on the telephone network 82. Through the established channel, the above-mentioned appeal-for-participation information is transmitted.

The registration management database 17 stores various pieces of information on a registered person who can use the content distribution service and the multi-user talking service provided by the content distribution/multi-user talking service center 1.

FIG. 3 shows an example of registered contents of the registration management database 17.

As shown in the figure, the registration management database 17 registers: identification information (a user name and a password) 172 of each registered person; private information 173 including a name, an address, self-introduction, etc.; and accounting information 174 indicating a state of charging for use of the content distribution service; in association with a registration number 171 uniquely assigned to each registered person.

The instruction receiving unit 131 informs the authentication unit 15 of identification information included in a request for viewing a content. And, the authentication unit 15 investigates whether the received identification information is registered in the registration management database 17. By this, the authentication unit 15 authenticates the request for viewing, and informs the instruction receiving unit 131 of the result of the authentication. At that time, when the authentication is successful, the authentication unit 15 informs the instruction receiving unit 131 to that end, while informing it of the registration number 171 associated with the above-mentioned identification information in the registration management database 17.

When the authentication by the authentication unit 15 is successful, then, the accounting unit 16 adds a charge for using the content distribution service to accounting information 174 corresponding, in the registration management database 17, to the identification information included in the request for viewing for which the above-mentioned authentication has resulted in success.

The content distribution control unit 13 comprises the instruction receiving unit 131, a viewer management unit 132, a viewer management database 133, the content distribution unit 134, and a content database 135.

The instruction receiving unit 131 receives a request for viewing a content from an IP terminal 4 or the receiving terminal 5 through the IP network interface unit 11 or the telephone network interface unit 12, and informs the authentication unit 15 of the identification information included in the received request for viewing. When the authentication unit 15 informs the instruction receiving unit 131 of success of authentication together with the registration number 171, then, the instruction receiving unit 131 informs the viewer management unit 132 of the registration number 171, the request for viewing, and the transmission source address of the request for viewing in question. The transmission source address is an IP address when the transmission source is an IP terminal 4, and the telephone number when the transmission source is the receiving terminal 5.

The viewer management unit 132 registers the registration number 171, the channel number of the content, which is included in the request for viewing, and the transmission source address of the request for viewing, into the viewer management database 133, associating these items with one another.

FIG. 4 shows an example of registered contents of the viewer management database 133.

As shown in the figure, under each channel number 1351 as identification information of a content, the viewer management database 133 registers a registration number 171 of a viewer who has made a request for viewing the content in question, and a transmission source address 1331 of the request for viewing the content in question, associating these items with each other. Here, the transmission source address 1331 is an IP address when the transmission source is an IP terminal 4, and a telephone number when the transmission source is the receiving terminal 5.

The content database 135 registers a content that the content distribution/multi-user talking service center 1 can distribute.

FIG. 5 shows an example of registered contents of the content database 135.

As shown in the figure, the content database 135 registers a channel number 1351 as identification information of a content, and content data 1353 and descramble key 1354 for each channel number. Here, the descramble key 1354 is used by the receiving terminal 5 for canceling scramble applied to the content, when the receiving terminal 5 enjoys the content distribution service through the CATV network 83.

The content distribution unit 134 reads content data 1353 from the content database 135, and provides the content data 1353 with the channel number 1351 of the content data 1353 in question. Further, the content distribution unit 134 reads the address 1331 registered in the viewer management database 133 in association with the channel number 1351 in question. Then, the content distribution unit 134 delivers the above-mentioned content data 1353 added with the channel number 1351 and the above-mentioned read address 1331, to the IP network interface unit 11.

At that time, when the address 1331 registered in the viewer management database 133 in association with the channel number 1351 in question includes a telephone number, then, the content distribution unit 134 delivers the IP address of the content relay apparatus 3 instead of the telephone number in question, to the IP network interface unit 11. It is assumed that the address of the content relay apparatus 3 has been informed to the content distribution/ multi-user talking service center 1 in advance.

The multi-user talking control unit 14 comprises the instruction receiving unit 141, a participant management unit 142, a participant management database 143, the multi-user talking data generation unit 144, and the multi-user talking data distribution unit 145.

The instruction receiving unit 141 receives a request for participation in multi-user talking from an IP terminal 4 or the receiving terminal 5 through the IP network interface unit 11 or the telephone network interface unit 12, and sends the received request for participation and the transmission source address of the request for participation, to the participant management unit 142. Further, the instruction receiving unit 141 receives a request for appeal for participation in multi-user talking from an IP terminal 4 or the receiving terminal 5 through the IP network interface unit 11 or the telephone network interface unit 12, and sends the received request for appeal for participation and the transmission source address of the request for appeal for participation, to the participant management unit 142. Then, according to an instruction of the participant management unit 142, the instruction receiving unit 141 appeals to viewers of the content received by the terminal 4, 5, which has transmitted the above-mentioned request for appeal for participation, to participate in multi-user talking, and receives answers to the appeal.

The participant management unit 142 investigates whether the transmission source address of the request for participation received from the instruction receiving unit 141 is registered in the viewer management database 133 in association with the channel number 1351 included in the request for participation. The transmission source address is an IP address when the transmission source is an IP terminal 4, and the telephone number when the transmission source is the receiving terminal 5. When the transmission source address is registered, the participant management unit 142 registers the transmission source address in question and the registration number 171 registered in the viewer management database 133 in association with the transmission source address, into the participant management database 143 in association with the channel number 1351 included in the above-mentioned request for participation. At that time, when the transmission source address of the request for participation is the telephone number, i.e., when the transmission source of the request for participation is the receiving terminal 5, then, the participant management unit 142 additionally registers the telephone number included in the request for participation in question into the participant management database 143. The telephone number is one of the portable telephone 7 used for multi-user talking by the operator of the receiving terminal 5.

FIG. 6 shows an example of registered contents of the participant management database 143.

As shown in the figure, the participant management database 143 registers, under each channel number 1351 as identification information of a content, a registration number 171 of a viewer (participant) who has made a request for viewing the content of the channel number 1351 in question and a request for participation, a transmission source address 1331 of the request for participation, and a telephone number 1352 included in the request for participation when the transmission source address 1331 is the receiving terminal 5, associating these items with each other. Here, the transmission source address 1331 is an IP address when the transmission source 1331 is an IP terminal 4 and the telephone number when the transmission source is the receiving terminal 5, and the telephone number 1352 is one of the portable telephone 7 used for multi-user talking by the operator of the receiving terminal 5.

Further, participant management unit 142 investigate whether the transmission source address of the request for appeal for participation received from the instruction receiving unit 141 is registered in the participant management database 143 in association with the channel number 1351 included in the request for appeal for participation. Here, the transmission source address is an IP address when the transmission source is the IP terminal 4, and the telephone number when the transmission source is the receiving terminal 5. When the transmission source address is registered, then, the participant management unit 142 extracts registration numbers 171 other than the registration number 171 registered in association with the above-mentioned channel number 1351 in the participant management database 143, out of the registration numbers 171 registered in the viewer management database 133 in association with the channel number 1351 included in the request for appeal for participation in question. Then, the participant management unit 142 extracts private information 173 registered in association with the extracted registration numbers 171, from the registration management database 17. Then, the participant management unit 142 generates appeal-for-participation selection information for the operator of the terminal, which has transmitted the request for appeal for participation, to select private information of a viewer to whom the operator appeals for participation, out of the extracted pieces of private information 173. The participant management unit 142 transmits the generated appeal-for-participation selection information to the transmission source address of the above-mentioned request for appeal for participation, through the instruction receiving unit 141.

Here, when the transmission source address of the above-mentioned request for appeal for participation is an IP address, i.e., when the terminal that has transmitted the request for appeal for participation is an IP terminal 4, then, the appeal-for-participation selection information is transmitted to the IP terminal 4 through the IP network interface unit 11 and the IP network 81. On the other hand, when the transmission source address of the above-mentioned request for participation is the telephone number, i.e., when the terminal that has transmitted the request for appeal for participation is the receiving terminal 5, then, the appeal-for-participation selection information is transmitted to the receiving terminal 5 through the telephone network interface unit 12 and the telephone network 82.

When the participant management unit 142 receives a result of the selection of private information of a viewer to whom participation is to be appealed, from the terminal that has transmitted the above-mentioned request for appeal for participation, the participant management unit 142 transmits appeal-for-participation information to the address 1331 registered in the viewer management database 133 in association with the registration number 171 of the private information of the viewer indicated by the selection result. Here, when the address 1331 to which the appeal-for-participation information is to be transmitted is an IP address, i.e., when the terminal of the viewer indicated by the selection result is an IP terminal 4, then, the participant management unit 142 transmits the appeal-for-participation information to the IP terminal in question through the IP network interface unit 11 and the IP network 81. On the other hand, when address 1331 to which the appeal-for-participation information is to be transmitted is the telephone number, i.e., when the terminal of the viewer indicated by the selection result is the receiving terminal 5, then, the appeal-for-participation information is transmitted to the receiving terminal 5 through the telephone network interface unit 12 and the telephone network 82.

When the participant management unit 142 receives an answer from the terminal to which appeal for participation is transmitted, to the effect that it will participate, then, the participant management unit 142 registers the address 1331 of the terminal in question and the registration number 171 of the private information of the viewer indicated by the above-mentioned selection result, into the participant management database 143 in association with the channel number 1351 that is registered in the viewer management database 133 in association with the mentioned registration number 171.

Further, the participant management unit 142 obtains the telephone number 1352 and the channel number 1351 under which the telephone number 1352 is registered, from the participant management database 143. And, the participant management unit 142 sends relay information, which comprises a pair of the telephone number 1352 and the channel number 1351, to the multi-user talking relay apparatus 2 through a dedicated control line. This relay information is used by the multi-user talking relay apparatus 2 for deciding data relay between the IP network 81 and the telephone network 82.

The multi-user talking data generation unit 144 synthesizes pieces of talking data received from the IP network interface unit 11, with respect to each channel number 1351 given to the talking data, to generate multi-user talking data. Then, the multi-user talking data generation unit 144 provides multi-user talking data with the channel number 1351 that has been added to each piece of talking data from which the multi-user talking data in question is synthesized, and delivers the resultant multi-user talking data to the multi-user talking data distribution unit 145.

The multi-user talking data distribution unit 145 investigates the channel number 1351 given to the multi-user talking data received from the multi-user talking data generation unit 144, to obtain the addresses 1331 registered in association with the channel number 1351 in question in the participant management database 143. Then, the multi-user talking data added with the channel number 1351 in question is transmitted together with the obtained addresses 1331 to the IP network interface unit 11. At that time, when the obtained addresses 1331 include the telephone number, then, the IP address of the multi-user talking relay apparatus 2 is transmitted to the IP network interface unit 11, in place of the telephone number.

Figure 12:
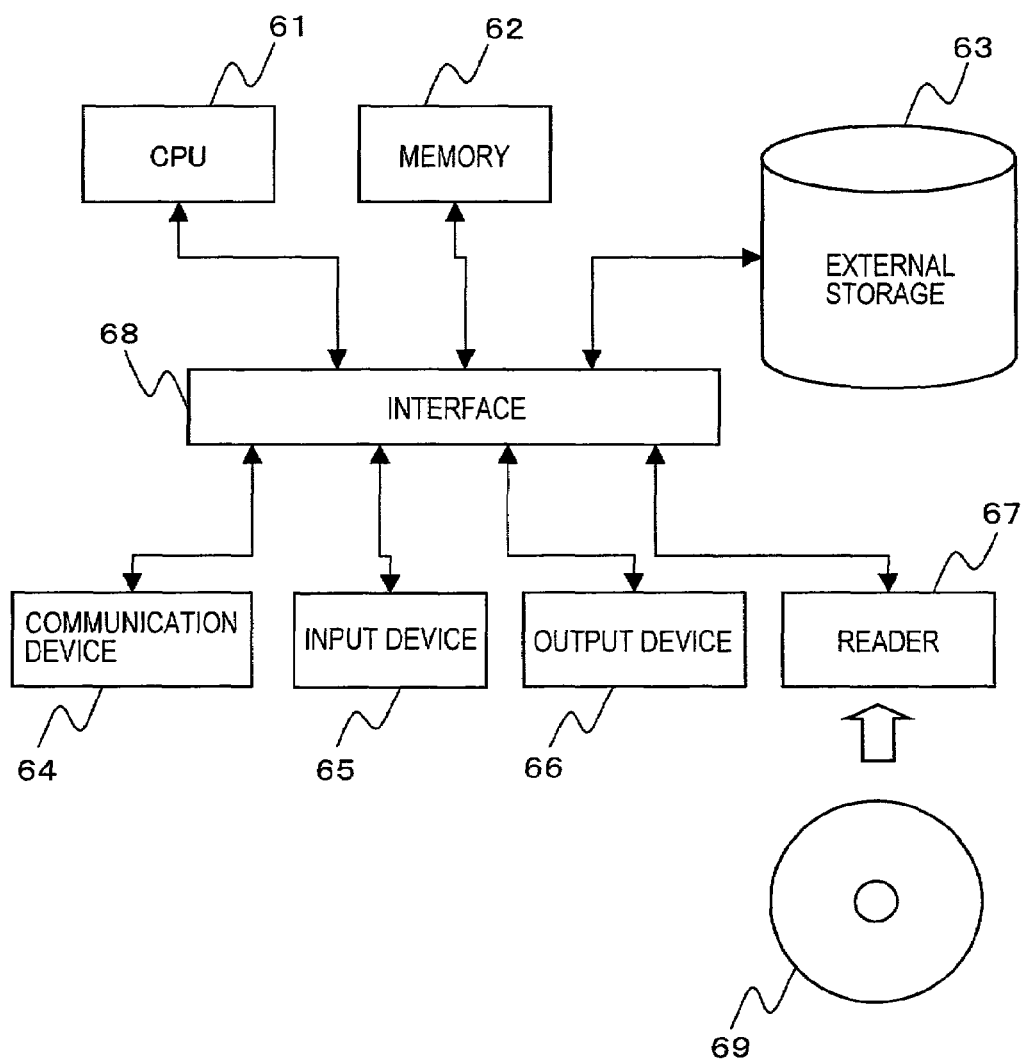
FIG. 12 is a diagram showing an example of a hardware configuration of each component apparatus in the multi-user talking system shown in FIG. 1.

The content distribution/multi-user talking service center 1 having the above-described configuration can be implemented on an ordinary computer, such as a PC, for example as shown in FIG. 12, comprising: a CPU 61, a memory 62, an external storage 63 such as a hard disk, a communication device 64 for communicating with another apparatus through the IP network 81 and the telephone network 82, an input device 65 such as a keyboard or a mouse, an output device 66 such as a monitor, a reader for reading data from a storage medium 69 such as a CD-ROM or FD, and an interface 68 for sending and receiving data between these component devices, with the CPU 61 executing a specific program loaded on the memory 62. This specific program may be obtained from the storage medium 69 through the reader 67, or from the IP network 81 and the telephone network 82 through the communication device 64, to directly load onto the memory 62. Or, the program may be stored once into the external storage 63 and then loaded onto the memory 62.

Next, an IP terminal 4 will be described.

Figure 7:
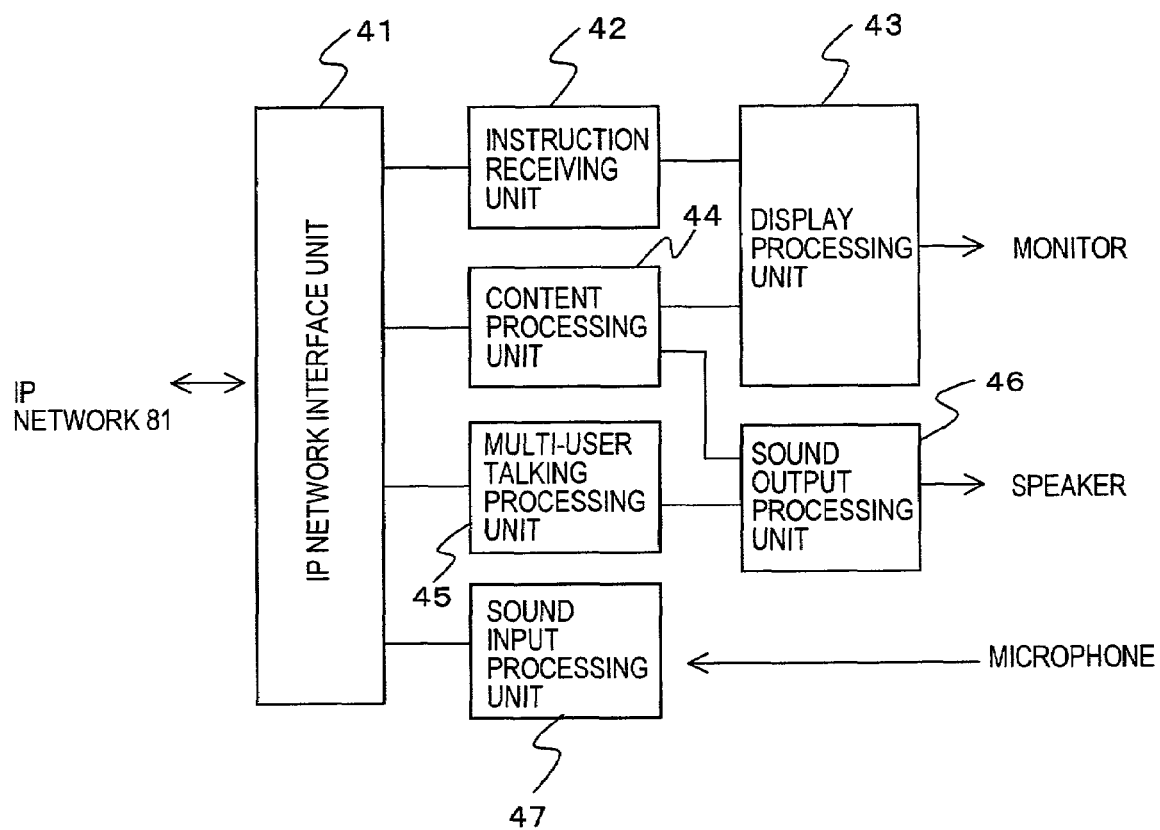
FIG. 7 is a schematic block diagram showing an IP terminal 4 shown in FIG. 1.

FIG. 7 is a schematic block diagram showing an IP terminal 4.

As shown in the figure, an IP terminal 4 comprises an IP network interface unit 41 for communicating with another apparatus through the IP network 81, an instruction receiving unit 42, a display processing unit 43, a content processing unit 44, a multi-user talking processing unit 45, a sound output processing unit 46, and a sound input processing unit 47.

The IP interface unit 41 obtains IP packets addressed to itself from the IP network 81, and assembles the obtained IP packets to restore data. When the restored data is content data, the IP interface unit 41 delivers the data to the content processing unit 44. When the restored data is multi-user talking data, the data is delivered to the multi-user talking processing unit 45. Further, when the restored data is appeal-for-participation selection information, appeal-for-participation information, or other confirmatory information, then the data is delivered to the instruction receiving unit 42.

Further, the IP network interface unit 41 converts one of various instructions such as a request for participation and a request for appeal for participation received from the instruction receiving unit 42 and talking data received from the sound input processing unit 47 into IP packets, and adds the address of the content distribution/multi-user talking service center 1 to a header of each IP packet to transmits the IP packets onto the IP network 81.

The instruction receiving unit 42 complies with an instruction received from, for example, an operator of an IP terminal 4, to control the display processing unit 43 to display a menu screen on the display unit such as a monitor. Then, receiving one of various instructions such as a request for viewing a content, a request for participation, or a request for appeal for participation from the operator through the menu screen, the instruction receiving unit 42 informs the IP network interface unit 41 of the received instruction. Further, the instruction receiving unit 42 controls the display processing unit 43 to display information received from the IP network interface unit 41, onto the display unit, to receive an instruction from the operator if necessary.

The content processing unit 44 removes a channel number 1351 from content data received from the IP network interface unit 41. Then, the content processing unit 44 processes the content data according to the format of the content data, to convert the data into video data or audio data of a format that can be processed in the display processing unit 43 or the sound output processing unit 46. Then, the content processing unit 44 outputs the converted video data or audio data to the display processing unit 43 or the sound output processing unit 46, respectively.

The display processing unit 43 displays a content image of the video data received from the content processing unit 44, on the display unit. Further, according to an instruction from the instruction receiving unit 42, and using, for example, on-screen display or the like, the display processing unit 43 displays, for example, a menu screen for receiving one of various instructions from the operator of the IP terminal 4, on the screen displayed on the display unit.

The multi-user talking processing unit 45 removes a channel number 1351 from multi-user talking data received from the IP network interface unit 41. And then, the multi-user talking processing unit 45 processes the multi-user talking data according to the format of the multi-user talking data in question, to convert the data into audio data of a format that can be processed in the sound output processing unit 46. Then, the multi-user talking processing unit 45 outputs the converted audio data to the sound output processing unit 46.

The sound input processing unit 47 gives a channel number 1351 that is added to content data under processing by the content processing unit 44, to talking data of the operator of the IP terminal, which is received through a sound input device such as a microphone. Then, the sound input processing unit 47 outputs the talking data added with the channel number to the IP network interface unit 41.

The sound output processing unit 46 outputs content sound of audio data, which is received from the content processing unit 44, through a sound output device such as a speaker. Further, the sound output processing unit 46 outputs sound of multi-user talking data, which is received from the multi-user talking processing unit 45, through the sound output device.

Here, similarly to the content distribution/multi-user talking service center 1, the IP terminal having the above-described configuration can be implemented on an ordinary computer such as the PC shown in FIG. 12 for example, with the CPU 61 executing a specific program loaded onto the memory 62.

Next, the receiving terminal 5 will be described.

Figure 8:
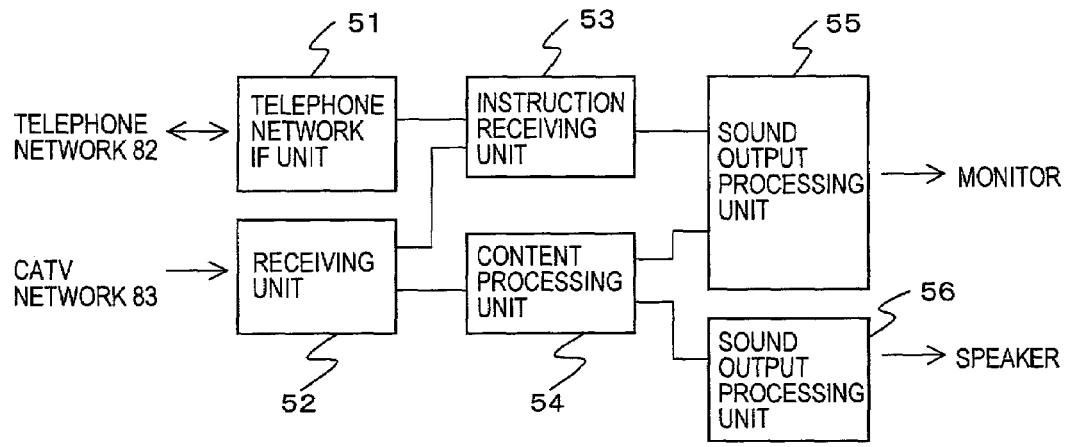
FIG. 8 is a schematic block diagram showing the receiving terminal 5 shown in FIG. 1.

FIG. 8 is a schematic block diagram showing the receiving terminal 5.

As shown in the figure, the receiving terminal 5 comprises a telephone network interface unit 51 for communicating with another apparatus through the telephone network 82, a receiving unit 52 for receiving a content transmitted onto the CATV network 83, an instruction receiving unit 53, a content processing unit 54, a display processing unit 55, and a sound output processing unit 56.

The telephone network interface unit 51 complies with an instruction from the instruction receiving unit 53 or with an arrival from the content distribution/multi-user talking service center 1 to establish a channel with the content distribution/multi-user talking service center 1 using the telephone network 82. Then, the telephone network interface unit 51 transmits one of various instructions such as a request for participation and a request for appeal for participation, which is received from the instruction receiving unit 53, to the content distribution/multi-user talking service center 1 through the established channel. Further, the telephone network interface unit 51 receives appeal-for-participation selection information, appeal-for-participation information, or other confirmatory information from the content distribution/multi-user talking service center 1, and delivers the received information to the instruction receiving unit 42.

The receiving unit 52 receives content data having a content's channel number designated by the instruction receiving unit 53 among contents sent onto the CATV network 83, cancels scramble applied to the content data using a descramble key informed in advance from the content distribution/multi-user talking service center 1, and then, delivers the content data to the content processing unit 54.

The instruction receiving unit 53 complies with an instruction received from, for example, the operator of the receiving terminal 5, to control the display processing unit 55 to display a menu screen on the display unit such as a monitor. Then, receiving one of various instructions such as a request for viewing a content, a request for participation, or a request for appeal for participation from the operator through the menu screen in question, the instruction receiving unit 53 informs the telephone network interface unit 51 of the received instruction. Further, the instruction receiving unit 53 controls the display processing unit 55 to display information received from the telephone network interface unit 51 onto the display unit, and receives an instruction from the operator if necessary.

The content processing unit 54 processes content data received from the receiving unit 52 according to the format of the content data, to convert the data into video data or audio data of a format that can be processed in the display processing unit 55 or the sound output processing unit 56. Then, the converted video data or audio data is outputted to the display processing unit 55 or the sound output processing unit 56, respectively.

The display processing unit 55 displays a content image of the video data received from the content processing unit 54 onto the display unit such as a monitor. Further, the display processing unit 55 complies with an instruction from the instruction receiving unit 53 to display, for example, a menu screen for receiving one of various instructions from the operator of the receiving terminal 5 on the screen displayed on the display unit, using, for example, on-screen display or the like.

The sound output processing unit 56 outputs content sound of the audio data received from the content processing unit 54, through the sound output device such as a speaker.

Here, the receiving terminal 5 having the above-described configuration may be implemented by hardware using integrated logic ICs such as ASIC, FPGA, and the like, or may be implemented by software utilizing a combination of such integrated logic ICs and a processor such as DSP. Or, similarly to the content distribution/multi-user talking service center 1, the receiving terminal 5 may be implemented on an ordinary computer such as the PC shown in FIG. 12 for example, with the CPU 61 executing a specific program loaded on the memory 62 (although a receiver for receiving a content from the CATV network 83 is additionally required in the case of the receiving terminal 5).

Next, the content relay apparatus 3 will be described.

Figure 9:
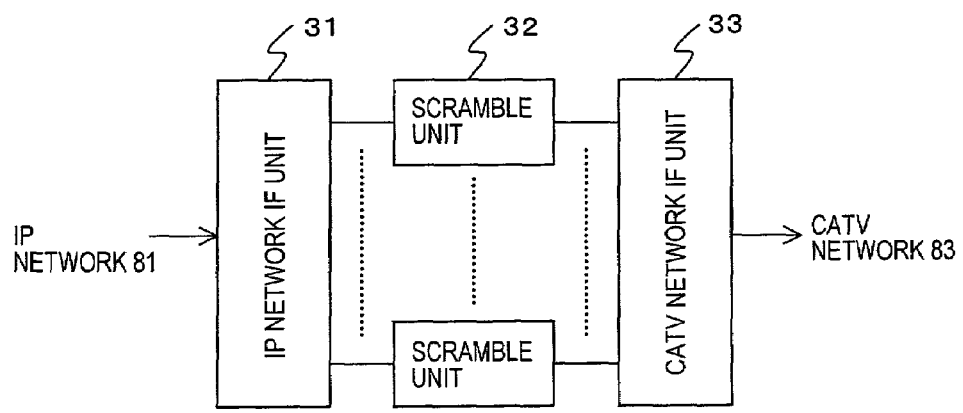
FIG. 9 is a schematic block diagram showing the content relay apparatus 3 shown in FIG. 1.

FIG. 9 is a schematic block diagram showing the content relay apparatus 3.

As shown in the figure, the content relay apparatus 3 comprises: an IP network interface unit 31 for communicating with another apparatus through the IP network 81; a plurality of scramble units 32 provided respectively to channel numbers of contents stored in the content database 135 of the content distribution/multi-user talking service center 1; and a CATV network interface unit 33 for broadcasting content data through the CATV network 83.

The IP network interface unit 31 obtains IP packets addressed to itself from the IP network 81, and assembles the obtained IP packet to restore content data. Then, the IP network interface unit 31 removes the channel number 1351 of the content from the restored content data, and delivers the data to the scramble unit 35 provided in association with the channel number 1351 removed.

Each of the scramble units 32 scrambles content data received from the IP network interface unit 31, and delivers the scrambled content data to the CATV network interface unit 33.

The CATV network interface unit 33 converts pieces of content data received respectively from the scramble units 32 into multiplex data according to a prescribed rule, to transmits the multiplex data onto the CATV network 83.

Here, the content relay 3 having the above-described configuration may be implemented by hardware using integrated logic ICs such as ASIC, FPGA, and the like, or may be implemented by software utilizing a combination of such integrated logic ICs and a processor such as DSP. Or, similarly to the content distribution/multi-user talking service center 1, the content relay 3 may be implemented on an ordinary computer such as the PC shown in FIG. 12, with the CPU 61 executing a specific program loaded on the memory 62 (although a transmitter for transmitting a content onto the CATV network 83 is additionally required in the case of the content relay apparatus 3).

Next, the multi-user talking relay 2 will be described.

Figure 10:
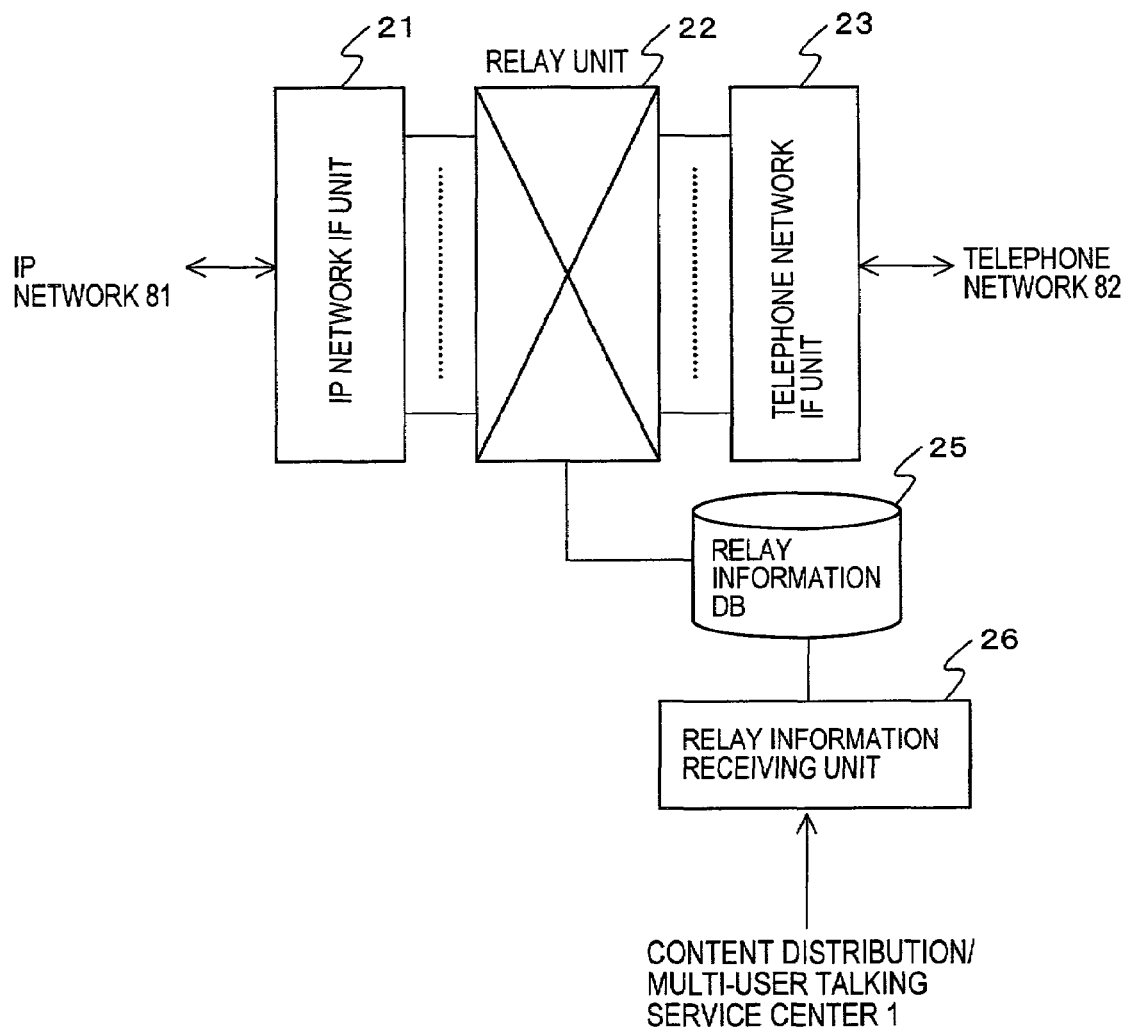
FIG. 10 is a schematic block diagram showing the multi-user talking relay apparatus 2 shown in FIG. 1.

FIG. 10 is a schematic block diagram showing the multi-user talking relay apparatus 2.

As shown in the figure, the multi-user talking relay apparatus 2 comprises: an IP network interface unit 21 for communicating with another apparatus through the IP network 81; a telephone network interface unit 23 for communicating with another apparatus through the telephone network 82; a relay unit 22; a relay table storing unit 25; and a relay information receiving unit 26.

The IP network interface unit 31 obtains IP packets addressed to itself from the IP network 81, and assembles the obtained IP packets to restore multi-user talking data. And, the restored multi-user talking data is delivered to the relay unit 22. Further, the IP network interface unit 31 converts multi-user talking data, which is received from the relay unit 22, into IP packets, and adds the IP address of the content distribution/multi-user talking service center 1 to each IP packet to transmit the IP packets onto the IP network 81.

The telephone network interface unit 23 accommodates a plurality of telephone lines, receives talking data through any telephone line, and delivers the received talking data together with a telephone number of the destination of the telephone line in question, to the relay unit 22. Further, the telephone network interface unit 23 transmits multi-user talking data, which is received from the relay unit 22, onto a telephone line whose destination telephone number is informed from the relay unit 22.

The relay information receiving unit 26 receives relay information informed from the content distribution/multi-user talking service center 1, and stores the received relay information into the relay information database 25.

FIG. 11 shows an example of registered contents of the relay information database 25.

As shown in the figure, the relay information database 25 registers relay information, which is a pair of a content's channel number 1351 and a telephone number 1352, informed from the content distribution/multi-user talking service center 1.

The relay unit 22 relays data between the IP network interface unit 21 and the telephone network interface unit 23, according to relay information stored in the relay information database 25.

In detail, the relay unit 22 removes a channel number 1251 from multi-user talking data received from the IP network interface unit 21, and specifies the telephone number 1352 associated with the removed channel number 1351. Then, the relay unit 22 transmits the multi-user talking data together with the specified telephone number 1352 to the telephone network interface unit 23.

Further, the relay unit 22 specifies the channel number 1351 associated with a telephone number received together with talking data from the telephone network interface unit 23. Then, the relay unit 22 adds the specified channel number 1351 to the talking data, to deliver the data to the IP network interface unit 21.

Here, the multi-user talking relay apparatus 2 may be implemented by hardware using integrated logic ICs such as ASIC, FPGA and the like, or may be implemented by software utilizing a combination of such integrated logic ICs and a processor such as DSP. Or, similarly to the content distribution/multi-user talking service center 1, the multi-user talking relay apparatus 2 may be implemented on an ordinary computer such as the PC shown in FIG. 12 for example, with the CPU 61 executing a specific program loaded onto the memory 62.

Next, operation of the multi-user talking system having the above-described configuration will be described.

First, will be described operation in a case where an operator of a terminal 4, 5 enjoys the content distribution service.

Figure 13:
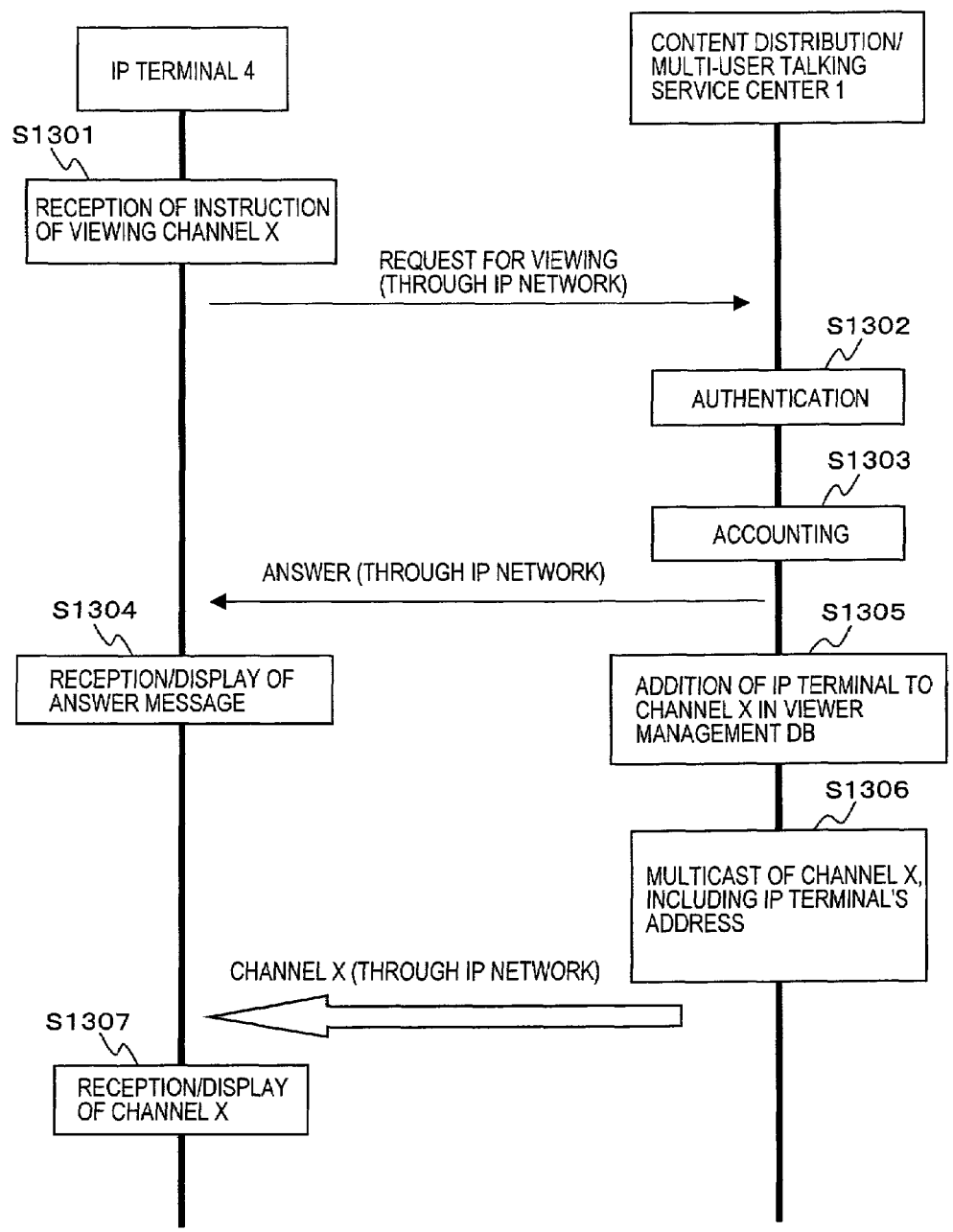
FIG. 13 is a diagram for explaining operation in a case where an operator of an IP terminal 4 enjoys a content distribution service in the multi-user talking system shown in FIG. 1.

FIG. 13 is a diagram for explaining operation in a case where an operator of an IP terminal 4 enjoys the content distribution service in the multi-user talking system shown in FIG. 1.

When the instruction receiving unit 42 of an IP terminal 4 controls the display processing unit 43 to display a menu screen on the display unit such as a monitor and receives designation of a channel number "X" of a content that the operator wishes to view, through the displayed menu screen, then, the instruction receiving unit 42 generates a request for viewing, which includes the channel number "X" of the designated content and identification information (a user name and a password) of the operator, which is stored in advance in a memory or the like. Then, the IP network interface unit 41 adds the IP address of the content distribution/multi-user talking service center 1 to headers of IP packets storing the above-mentioned request for viewing, to transmits the IP packets onto the IP network 81 (S1301).

When the instruction receiving unit 131 of the content distribution/multi-user talking service center 1 receives the request for viewing from the IP network 81, then the request for viewing is sent to the authentication unit 15. Receiving the request for viewing, the authentication unit 15 investigates if the identification information included in the request for viewing is registered in the registration management database 17, to authenticate the request for viewing (S1302). When the authentication is successful (i.e., when the above-mentioned identification information is registered in the registration management database 17), then, the authentication unit 15 makes the accounting unit 16 add a charge for viewing the content to accounting information registered in association with the identification information in the registration management database 17 (S1303). Further, the authentication unit 15 informs the instruction receiving unit 131 of the result of the authentication and (when the authentication is successful) the registration number registered in association with the above-mentioned identification information in the registration management database 17.

Being informed of these pieces of information, the instruction receiving unit 131 of the content distribution/multi-user talking service center 1 sends the authentication result received from the authentication unit 15 to the IP terminal 4 as the transmission source of the above-mentioned request for viewing, through the IP network interface unit 11 and the IP network 81.

The instruction receiving unit 42 of the IP terminal 4 receives the authentication result through the IP network interface unit 41, and makes the display processing unit 43 display the content of the received authentication result on the display unit (S1304).

Further, when the instruction receiving unit 131 of the content distribution/multi-user talking service center 1 receives the registration number from the authentication unit 15, then, the instruction receiving unit 131 sends this registration number, the request for viewing sent to the authentication unit 15, and the IP address of the IP terminal 4 as the transmission source address of the request for viewing, to the viewer management unit 132. Receiving these pieces of information, the viewer management unit 132 registers the above-mentioned registration number and the IP address of the IP terminal 4 in association with the content's channel number "X" included in the request for viewing, into the viewer management database 133 (S1305).

The content distribution unit 134 of the content distribution/multi-user talking service center 1 reads the content data of the channel number "X" from the content database 135, and adds the channel number "X" to the content data in question. Further, the content distribution unit 134 reads the addresses (including the IP address of the IP terminal 4) associated with the channel number "X" from the viewer management database 133. Then, the IP network interface unit 11 adds these addresses to headers of the IP packets storing the content data added with the channel number "X", to multicast the IP packets onto the IP network 81 (S1306).

The IP terminal 4 receives the IP packets addressed to itself from the IP network 81 through the IP network interface unit 41, and assembles the received IP packets to restore the content data. Then, the content processing unit 44 removes the channel number "X" added to the restored content data, converts the content data to a prescribed format, to output the data through the display unit such as a monitor and the sound output device such as a speaker (S1307). By this, the operator of the IP terminal 4 can look at and listen to the content of the channel number "X".

Figure 14:
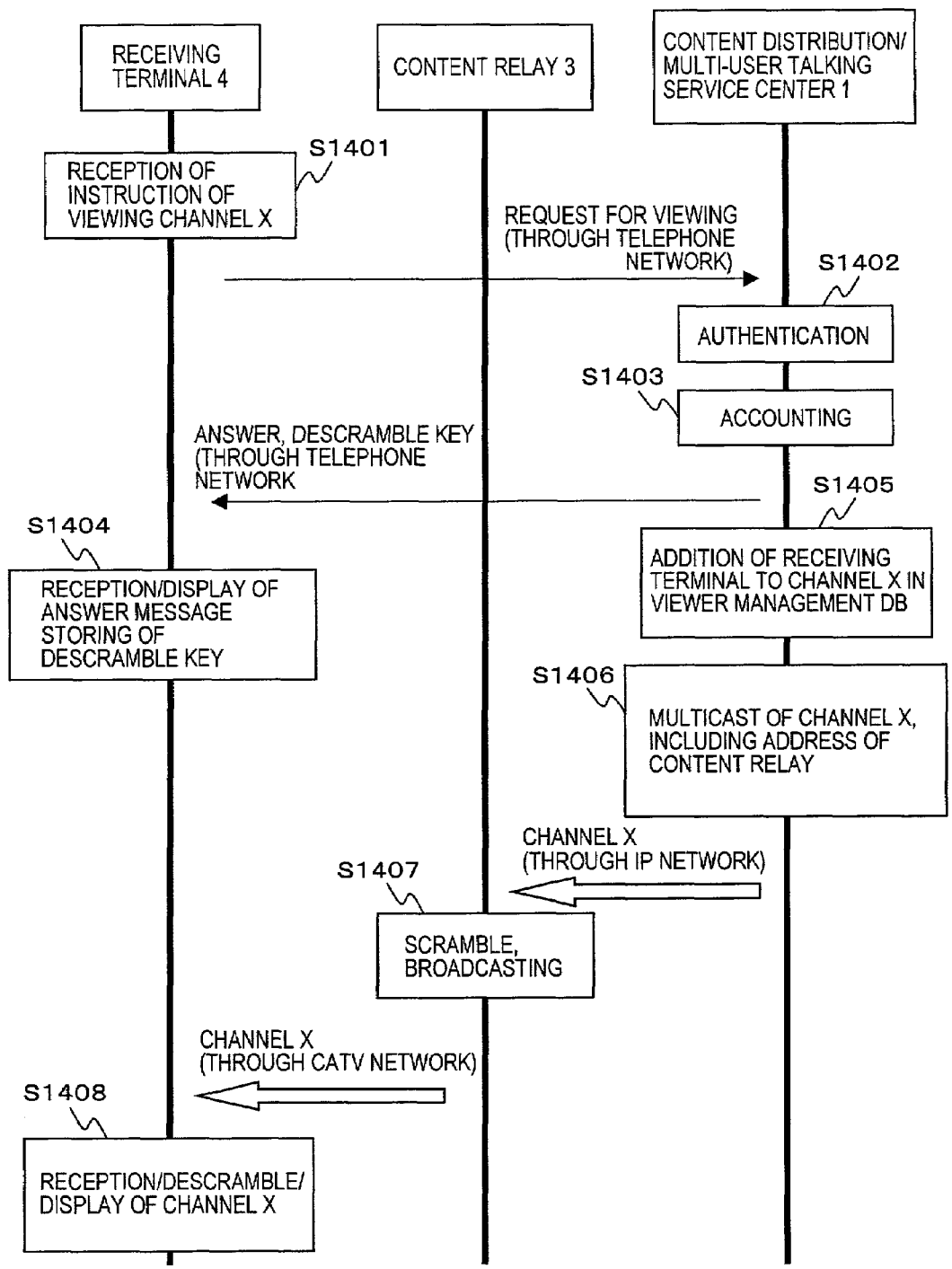
FIG. 14 is a diagram for explaining operation in a case where an operator of the receiving terminal 5 enjoys a content distribution service in the multi-user talking system shown in FIG. 1.

FIG. 14 is a diagram for explaining operation in a case where the operator of the receiving terminal 5 enjoys the content distribution service in the multi-user talking system shown in FIG. 1.

When the instruction receiving unit 53 of the receiving terminal 5 controls the display processing unit 55 to display the menu screen on the display unit such as a monitor and receives designation of the channel number "X" of the content that the operator wishes to view, from the operator through the menu screen, then, the instruction receiving unit 53 generates a request for viewing, which includes the designated content's channel number "X" and the operator's identification information (a user name and a password) that has been stored in advance in the memory or the like. Then, by means of the telephone network interface unit 51, the instruction receiving unit 53 establishes a channel with the content distribution/multi-user talking service center 1 on the telephone network 82. And, using the established channel, the instruction receiving unit 53 transmits the request for viewing, to the content distribution/multi-user talking service center 1 (S1401).

When the instruction receiving unit 131 of the content distribution/multi-user talking service center 1 receives the request for viewing, from the channel established on the telephone network 81, through the telephone network interface unit 12, then, the instruction receiving unit 131 informs the authentication unit 15 of the request for viewing. Receiving the request, the authentication unit 15 investigates if the identification information included in the request for viewing is registered in the registration management database 17, to authenticate the request for viewing (S1402). When the authentication is successful (i.e., when the identification information is registered in the registration management database 17), then, the authentication unit 15 makes the accounting unit 16 add a charge for viewing the content to accounting information registered in association with the identification information in the registration management database 17 (S1403). Further, the authentication unit 15 informs the instruction receiving unit 131 of the authentication result and (when the authentication is successful) the registration number registered in association with the above-mentioned identification information in the registration management database 17.

Receiving these pieces of information, the instruction receiving unit 131 of the content distribution/multi-user talking service center 1 sends the authentication result received from the authentication unit 15 to the receiving terminal 5 as the transmission source of the above-mentioned request for viewing, through the telephone network interface unit 12 and the above-mentioned channel. Here, when the authentication result indicates that the authentication has been successful, then, the instruction receiving unit 131 obtains descramble key registered in association with the content's channel number "X" included in the above-mentioned request for viewing in the content database 135, and sends this descramble key together with the authentication result to the receiving terminal 5.

The instruction receiving unit 53 of the receiving terminal 5 receives the authentication result through the above-mentioned channel and the telephone network interface unit 51, and makes the display processing unit 43 display the contents of the authentication result on the display unit. At that time, when the descramble key is also received, the descramble key is stored in the memory or the like (S1404).

Further, when the instruction receiving unit 131 of the content distribution/multi-user talking service center 1 receives the registration number from the authentication unit 15, then, the instruction receiving unit 131 sends this registration number, the request for viewing, which has been sent to the authentication unit 15, and the telephone number of the receiving terminal as the address of the transmission source of the request for viewing, to the viewer management unit 132. Receiving these pieces of information, the viewer management unit 132 registers the registration number and the telephone number of the receiving terminal 5 into the viewer management database 133, associating these items with the content's channel number "X" included in the request for viewing (S1405).

The content distribution unit 134 of the content distribution/multi-user talking service center 1 reads the content data of the channel number "X" from the content database 135, and adds the channel number "X" to the content data.

Further, the content distribution unit 134 reads addresses (including the telephone number of the receiving terminal 5) associated with the channel number "X" from the viewer management database 133. Then, the IP network interface unit 11 adds these addresses to each header of the IP packets that stores the content data added with the channel number "X", and multicasts the IP packets onto the IP network 81. Since the read addresses include the telephone number, the IP address of the content relay 3 is added to each header of the IP packets, instead of the telephone number in question (S1406).

The IP interface unit 31 of the content relay apparatus 3 receives the IP packets addressed to itself from the IP network 81, and assembles the received IP packets to restore the content data. Then, the channel number "X" added to the restored content data is removed, and then, the content data is delivered to the scramble unit 32 corresponding to the channel number "X". Receiving the content data of the channel number "X", the scramble unit 32 scrambles the content data using the scramble key prepared in advance. The CAVT network interface unit 33 converts this scrambled content data of the channel "X" together with pieces of content data of other channels into multiplex data, and transmits the multiplex data onto the CATV network 83 (S1407).

The receiving unit 52 of the receiving terminal 5 receives the content data of the channel "X" from the CATV network 83. Then, the receiving unit 52 cancels the scrambling of the content data, using the descramble key that has been received from the content distribution/multi-user talking service center 1 and stored in the memory or the like in advance. Then, the content processing unit 54 converts the descrambled content data into a prescribed format, and outputs the data through the display unit such as a monitor and the sound output device such as a speaker (S1408). By this, the operator of the receiving terminal 5 can look at and listen to the content of the channel number "X".

Next, will be described operation in a case where an operator of a terminal 4, 5 enjoys the multi-user talking service.

First, will be described a case where an operator of a terminal 4, 5 makes a request for participation in multi-user talking to enjoy the multi-user talking service.

Figure 15:
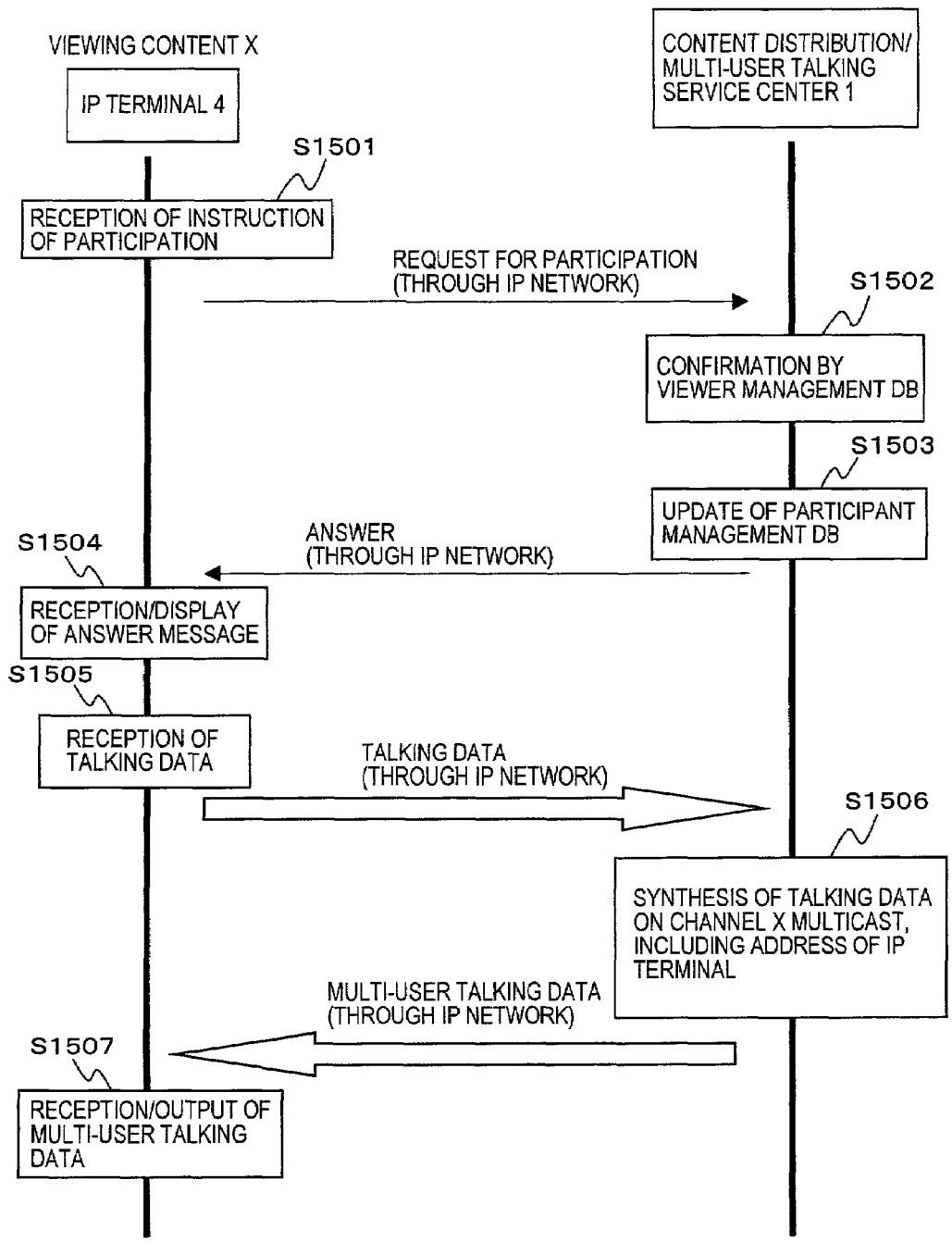
FIG. 15 is a diagram for explaining operation in a case where an operator of an IP terminal 4 enjoys the multi-user talking service by making a request for participation in multi-user talking in the multi-user talking system shown in FIG. 1.

FIG. 15 is a diagram for explaining operation in the case where the operator of the IP terminal 4 makes a request for participation in multi-user talking to enjoy the multi-user talking service.

The instruction receiving unit 42 of the IP terminal 4 controls the display processing unit 43 to display a menu screen on the display unit such as a monitor, and receives an instruction to participate in multi-user talking from the operator through the displayed menu screen. Then, the instruction receiving unit 42 generates a request for participation in multi-user talking, which includes the channel number "X" of the content under processing by the content processing unit 44. Then, the IP network interface unit 41 adds the IP address of the content distribution/multi-user talking service center 1 to each header of the IP packets that stores the above-mentioned request for participation, and transmits the IP packets onto the IP network 81 (S1501).

When the instruction receiving unit 141 of the content distribution/multi-user talking service center 1 receives the request for participation from the IP network 81 through the IP network interface unit 11, then, the instruction receiving unit 141 informs the participant management unit 142 of the request for participation and the IP address of the IP terminal 4 as the address of the transmission source of the request for participation.

Receiving these pieces of information, the participant management unit 142 investigates if the IP address of the IP terminal 4 as the address of the transmission source of the request for participation is registered in association with the content's channel number "X" included in the request for participation in the viewer management database 133 (S1502). When the IP address in question is registered, the participant management unit 142 permits participation in multi-user talking, and registers the IP address of the IP terminal 4 as the address of the transmission source of the request for participation and the registration number registered in association with the IP address in question in the viewer management database 133, into the participant management database 143, associating these items with the content's channel number "X" included in the request for participation (S1503). On the other hand, when the IP address of the IP terminal 4 is not registered in association with the channel number "X" in the viewer management database 133, the participant management unit 142 reject participation in multi-user talking. The participant management unit 142 informs the instruction receiving unit 141 of the approval or disapproval of participation in multi-user talking.

Receiving this, the instruction receiving unit 141 of the content distribution/multi-user talking service center 1 sends the approval or disapproval of participation in multi-user talking, which is received from the participant management unit 142, to the IP terminal 4 as the transmission source of the request for participation, through the IP network interface unit 11 and the IP network 81.

The instruction receiving unit 42 of the IP terminal 4 receives the approval or disapproval through the IP network interface unit 41, and makes the display processing unit 43 display the received approval or disapproval of participation in multi-user talking, on the display unit (S1504).

When participation in multi-user talking is permitted, the sound input processing unit 47 of the IP terminal 4 receives talking data from the sound input device such as a microphone, and adds the channel number "X" of the content under processing by the content processing unit 44. Then, the IP network interface unit 41 adds the IP address of the content distribution/multi-user talking service center 1 to each header of IP packets that store the talking data added with the channel number "X", and transmits the IP packets onto the IP network 81 (S1505).

The multi-user talking data generation unit 144 of the content distribution/multi-user talking service center 1 obtains pieces of talking data added with the channel number "X" from the IP network 81 through the IP network interface unit 11. Then, the multi-user talking data generation unit 144 removes the channel number "X" from each piece of the obtained talking data, and then, synthesizes the pieces of talking data to generate multi-user talking data. Then, the multi-user talking data generation unit 144 adds the channel number "X", which has been added to each piece of talking data from which the multi-user talking data in question is constructed, to the generated multi-user talking data, and delivers the resultant multi-user talking data to the multi-user talking data distribution unit 145. Receiving this multi-user talking data, the multi-user talking data distribution unit 145 reads addresses (including the IP address of the IP terminal 4) associated with the channel number "X" added to the multi-user talking data received from the multi-user talking data generation unit 144, from the participant management database 143. Then, the IP network interface unit 11 adds these addresses to each header of IP packets that stores the multi-user talking data added with the channel number "X", and multicasts the IP packets onto the IP network 81 (S1506).

At the IP network interface unit 41, the IP terminal 4 receives IP packets addressed to itself from the IP network 81, and assembles the received IP packets to restore the multi-user talking data. Then, the multi-user talking processing unit 45 removes the channel number "X" added to the restored multi-user talking data, and converts the multi-user talking data to a prescribed format to output the multi-user talking data through the sound output device such as a speaker (S1507). By this, the operator of the IP terminal 4 can participate in multi-user talking among viewers who are viewing the content of the channel number "X".

Figure 16:
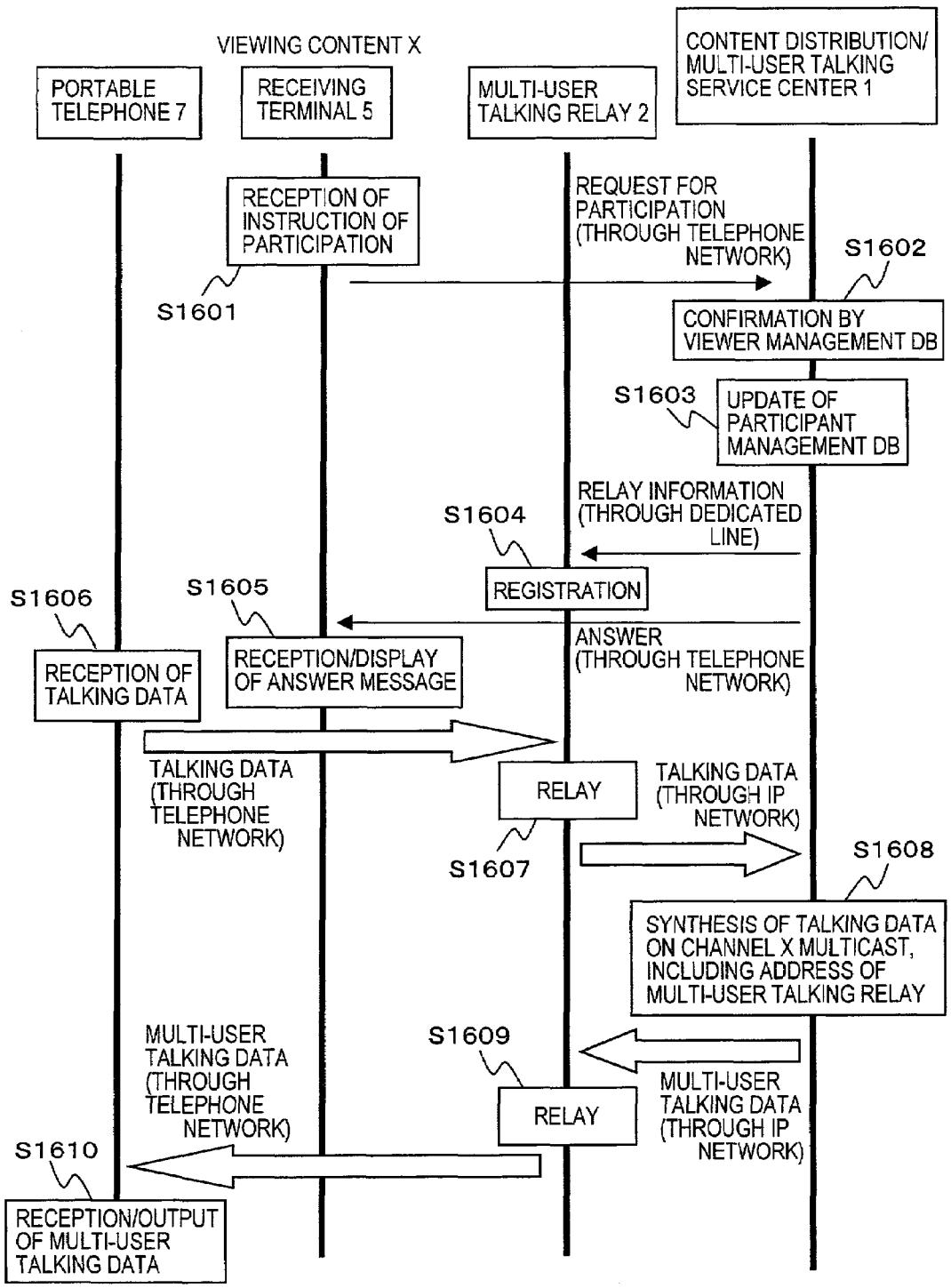
FIG. 16 is a diagram for explaining operation in a case where the operator of the receiving terminal 5 enjoys the multi-user talking service by making a request for participation in multi-user talking in the multi-user talking system shown in FIG. 1.

FIG. 16 is a diagram for explaining operation in a case where the operator of the receiving terminal 5 makes a request for participation in multi-user talking to enjoy the multi-user talking service in the multi-user talking system shown in FIG. 1.

When the instruction receiving unit 53 of the receiving terminal 5 controls the display processing unit 55 to display a menu screen on the display unit such as a monitor and receives an instruction to participate in multi-user talking from the operator through the menu screen, then, the instruction receiving unit 53 generates a request for participation in multi-user talking, which includes the channel number "X" of the content under processing by the content processing unit 54 and the telephone number of the portable telephone 7 of the operator. The telephone number has been stored in the memory or the like in advance. Then, the telephone network interface unit 51 establishes a channel with the content distribution/multi-user talking service center 1, on the telephone network 82, and transmits the request for participation to the content distribution/multi-user talking service center 1, through the established channel (S1601).

When the instruction receiving unit 141 of the content distribution/multi-user talking service center 1 receives the request for participation from the channel established on the telephone network 81, through the telephone network interface unit 12, then, the instruction receiving unit 141 sends the request for participation and the telephone number of the receiving terminal 5 as the address of the transmission source of the request for participation, to the participant management unit 142.

Receiving these pieces of information, the participant management unit 142 investigates if the viewer management database 133 registers the telephone number of the receiving terminal 5 as the address of the transmission source of the request for participation, in association with the content's channel number "X" included in the request for participation (S1602).

When the telephone number is not registered in association with the channel number "X" in the viewer management database 133, then, the participant management unit 142 rejects the request for participation in multi-user talking. On the other hand, when the telephone number is registered, participation in multi-user talking is permitted. And, the participant management unit 142 registers the telephone number of the receiving terminal 5 as the address of the transmission source of the request for participation, the registration number registered in association with the telephone number in question in the viewer management database 133, and the telephone number of the portable telephone 7, which is included in the request for participation, into the participant management database 143, associating these items with the content's channel number "X" included in the request for participation (S1603). Further, the participant management unit 142 sends relay information, which comprises a pair of the telephone number of the portable telephone 7 and the channel number "X" of the content, to the multi-user talking relay apparatus 2 through the dedicated control line. Receiving this relay information, the relay information receiving unit 26 of the multi-user relay apparatus 2 registers the relay information sent from the participant management unit 142, into the relay information database 25 (S1604).

The participant management unit 142 sends approval or disapproval of participation in multi-user talking to the instruction receiving unit 141. Receiving this, the instruction receiving unit 141 sends the approval or disapproval of the participation in multi-user talking, which is received from the participant management unit 142, to the receiving terminal 5 as the transmission source of the request for participation, through the telephone network interface unit 12 and the above-mentioned channel.

The instruction receiving unit 53 of the receiving terminal 5 receives the approval or disapproval of participation in multi-user talking, through the above-mentioned channel and the telephone network interface unit 51, and makes the display processing unit 43 display the content of the received information on the display unit (S1605).

When the operator of the receiving terminal 5 confirms the permission to participate in multi-user talking, then, the operator uses the portable telephone 7 (the telephone whose telephone number is informed by the request for participation) to call the multi-user talking relay apparatus 2. By this, a channel between the portable telephone 7 and the multi-user talking relay 3 is established on the telephone network 82. Thereafter, the portable telephone 7 transmits talking data, which is received from the operator, to the multi-user talking relay through the above-mentioned channel (S1606).

The relay unit 22 of the multi-user talking relay apparatus 2 adds the content's channel number "X" associated with the telephone number of the portable telephone 7 in the relay information database 25, to the talking data received from the portable telephone 7 through the above-mentioned channel and the telephone network interface unit 23. Then, the IP network interface unit 23 gives the IP address of the content distribution/multi-user talking service center 1 to each header of IP packets that store the talking data added with the channel number "X", and transmits the IP packets onto the IP network 81 (S1607).

The multi-user talking data generation unit 144 of the content distribution/multi-user talking service center 1 obtains pieces of talking data added with the channel number "X" from the IP network 81 through the IP network interface unit 11. Then, the multi-user talking data generation unit 144 removes the channel number "X" from each piece of talking data obtained, and synthesizes the pieces of talking data to generate multi-user talking data. Then, the multi-user talking data generation unit 144 adds the channel number "X", which has been added to each piece of talking data from which the multi-user talking data in question is synthesized, to the generated multi-user talking data, and delivers the resultant multi-user talking data to the multi-user talking data distribution unit 145. Receiving the multi-user talking data, the multi-user talking data distribution unit 145 reads addresses (including the telephone number of the receiving terminal 5) associated with the channel number "X", which is added to the multi-user talking data received from the multi-user talking data generation unit 144, from the participant management database 143. Then, the IP network interface unit 11 adds these addresses to each header of IP packets that store the multi-user talking data added with the channel number "X", and multicasts the IP packets onto the IP network 81. Here, since the read addresses include the telephone number, the IP address of the multi-user talking relay 2 is added to each header of the IP packets, in stead of the telephone number in question (S1608).

The IP network interface unit 21 of the multi-user talking relay apparatus 2 receives the IP packets addressed to itself from the IP network 81, assembles the received IP packets to restore the multi-user talking data, and delivers the restored multi-user talking data to the relay unit 22. The relay unit 22 removes the channel number "X" added to the multi-user talking data received. Then, by means of the telephone network interface unit 23, the relay unit 22 transmits the multi-user talking data, from which the channel number "X" has been removed, to the portable telephone 7 whose telephone number is registered in association with the above-mentioned removed channel number "X" in the relay information database 25, through the channel established with the portable telephone 7 (S1609).

The portable telephone 7 outputs sound according to the multi-user talking data received from the multi-user talking relay apparatus 2 (S1610). The operator of the receiving terminal 5 can participate in multi-user talking among viewers of the content of the channel number "X", by using the portable telephone 7.

Next, will be described operation in a case where an operator of a terminal 4, 5 appeals to an operator of another terminal 4, 5 for participation in multi-user talking.

Figure 17:
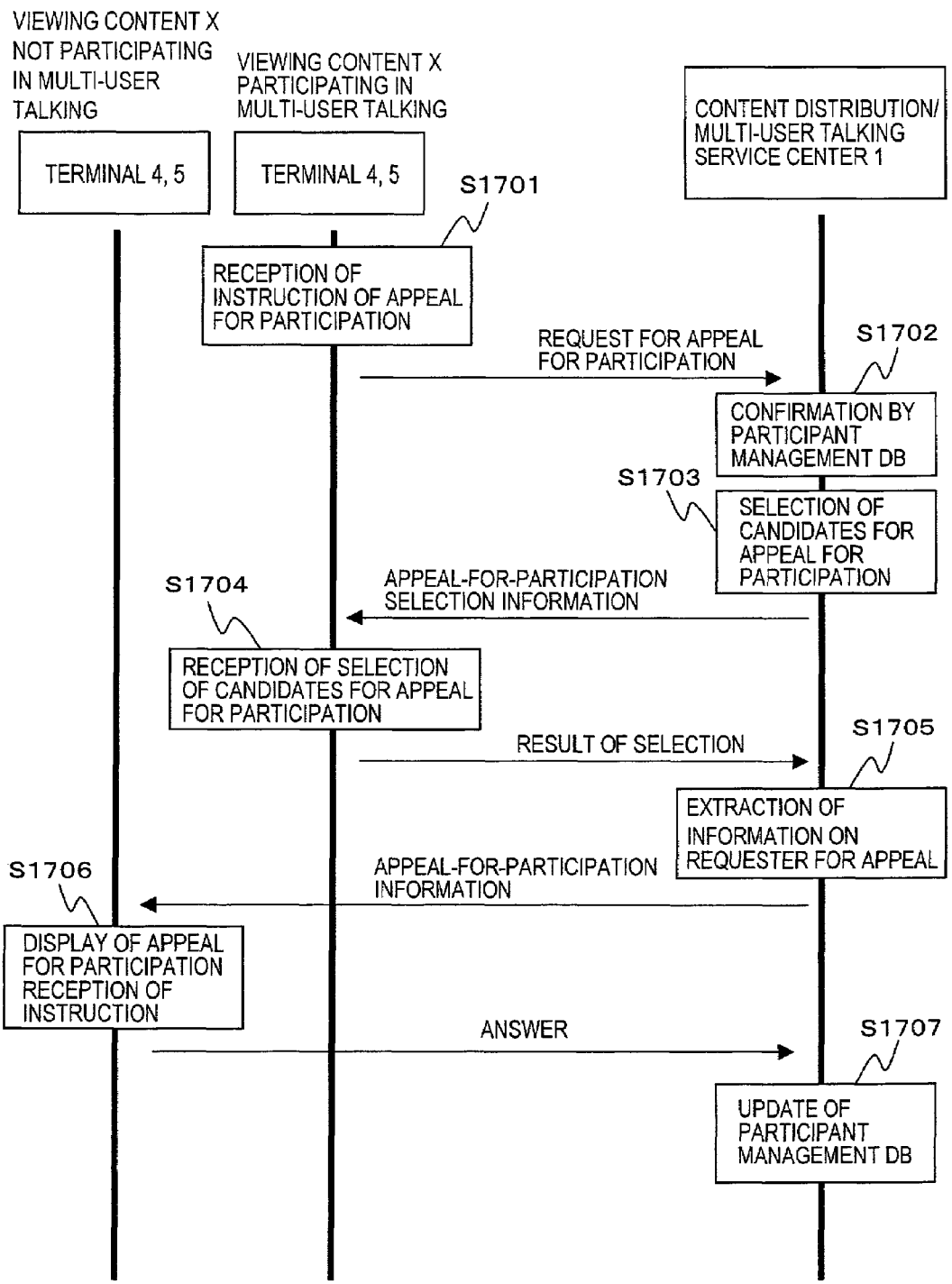
FIG. 17 is a diagram for explaining operation in a case where an operator of a terminal 4 or 5 appeals to an operator of another terminal 4 or 5 to participate in multi-user talking in the multi-user talking system shown in FIG. 1.

FIG. 17 is a diagram for explaining operation in the case where an operator of a terminal 4, 5 appeals to an operator of another terminal 4, 5 for participation in multi-user talking in the multi-user talking system shown in FIG. 1.

When a terminal 4, 5 receives an instruction of appeal for participation from its operator, then, the terminal 4, 5 generates a request for appeal for participation in multi-user talking, which includes a channel number "X" of the content under viewing, and transmits the generated request to the content distribution/multi-user talking service center 1 (S1701).

In detail, in the case of the IP terminal 4, when the instruction receiving unit 42 controls the display processing unit 43 to display the menu screen on the display unit such as a monitor and receives an instruction of appeal for participation in multi-user talking from the operator through the displayed menu screen, then, the instruction receiving unit 42 generates a request for appeal for participation in multi-user talking, which includes the channel number "X" of the content under processing by the content processing unit 44. Then, the IP network interface unit 4 gives the IP address of the content distribution/multi-user talking service center 1 to each header of IP packets that store the above-mentioned request for appeal for participation, and transmits the IP packets onto the IP network 81.

Further, in the case of the receiving terminal 5, the instruction receiving unit 53 controls the display processing unit 55 to display the menu screen on the display unit such as a monitor and receives an instruction of appeal for participation in multi-user talking from the operator through the displayed menu screen, then, the instruction receiving unit 53 generates a request for appeal for participation in multi-user talking, which includes the channel number "X" of the content under processing by the content processing unit 54. Then, the telephone network interface unit 51 establishes a channel with the content distribution/multi-user talking service center 1, on the telephone network 82, and transmits the request for appeal for participation to the content distribution/multi-user talking service center 1 through the established channel.

When the instruction receiving unit 131 of the content distribution/multi-user talking service center 1 receives the request for appeal for participation from the IP network 81 through the IP network interface unit 11, or from the channel established on the telephone network 81 through the telephone network interface unit 12, then, the instruction receiving unit 131 sends the request for appeal for participation and the transmission source address of the request for appeal for participation, to the participant management unit 142.

Receiving these pieces of information, the participant management unit 142 investigates if the address of the transmission source of the above-mentioned request for appeal for participation is registered in association with the content's channel number "X" included in the request for appeal for participation, in the participant management database 143 (S1702).

When the transmission source address is not registered in association with the channel number "X", then, the participant management unit 142 rejects the request for appeal for participation in multi-user talking. On the other hand, when the transmission source address is registered, the request for appeal for participation is permitted. And, the participant management unit 142 extracts registration numbers other than the registration numbers registered in association with the above-mentioned channel number "X", which is included in the request for appeal for participation, in the participant management database 143, out of the registration numbers registered in association with the content's channel number "X" in the viewer management database 133. Further, the participant management unit 142 extracts pieces of private information registered respectively in association with the extracted registration numbers, from the registration management database 17. Then, the participant management unit 142 selects viewers of the content of the channel "X", who are specified by the extracted pieces of private information, as candidates for the appeal for participation (S1703). Then, the participant management unit 142 generates appeal-for-participation selection information that includes respective pieces of private information on the selected candidates for the appeal for participation, and transmits the appeal-for-participation selection information to the address of the transmission source of the request for appeal for participation, through the instruction receiving unit 141.

In detail, in the case where the transmission source of the request for appeal for participation is the IP terminal 4, the instruction receiving unit 141 makes the IP network interface unit 11 add the IP address of the IP terminal 4 in question to each header of IP packets that store the above-mentioned appeal-for-participation selection information, and transmit the appeal-for-participation selection information onto the IP network 81. Further, in the case of where the transmission source of the request for appeal for participation is the receiving terminal 5, the instruction receiving unit 141 makes the telephone network interface unit 12 establish a channel with the receiving terminal 5, on the telephone network 82 and transmit the appeal-for-participation selection information to the receiving terminal 5 through the established channel.

When the terminal 4, 5, which has transmitted the request for appeal for participation, receives the appeal-for-participation selection information from the content distribution/multi-user talking service center 1, the terminal 4, 5 makes its operator select a viewer to whom the operator appeals for participation out of the viewers of the content of the channel number "X" who are specified by the appeal-for-participation selection information. Then, the selected viewer is informed to the content distribution/multi-user talking service center 1 (S1704).

In detail, when the terminal that has transmitted the request for appeal for participation is an IP terminal 4, then, the instruction receiving unit 42 receives the appeal-for-participation selection information from the content distribution/multi-user talking service center 1 through the IP network interface unit 41. Then, the instruction receiving unit 42 controls the display processing unit 43 to display the menu screen on the display unit such as a monitor, and receives selection of a viewer to whom participation is appealed out of the viewers of the content of the channel number "X", who are specified by the appeal-for-participation selection information, through the displayed menu screen. Then, the received selection result is transmitted to the content distribution/multi-user talking service center 1 through the IP network interface unit 41 and the IP network 81.

When the terminal that has transmitted the request for appeal for participation is the receiving terminal 5, then, the instruction receiving unit 53 receives the appeal-for-participation selection information from the content distribution/multi-user talking service center 1 through the telephone network interface unit 51 and through a channel established on the telephone network 82. Then, the instruction receiving unit 53 controls the display processing unit 55 to display the menu screen on the display unit such as a monitor and receives selection of a viewer to whom participation is appealed out of the viewers of the content of the channel number "X", who are specified by the appeal-for-participation selection information, through the displayed menu screen. Then, the received selection result is transmitted to the content distribution/multi-user talking service center 1 through the telephone network interface unit 51 and the above-mentioned channel.

The participant management unit 142 of the content distribution/multi-user talking service center 1 receives the selection result of the viewer to whom participation is appealed from the terminal that has transmitted the request for appeal for participation, through the IP network interface unit 11 and the IP network 81, or through the telephone network interface unit 12 and the channel established on the telephone network 81. Then, the participant management unit 142 extracts private information of the operator of the terminal that has transmitted the request for appeal for participation (i.e., the person who has made the request for appeal for participation) (S1705). Here, the private information of the operator is registered in association with the address of the transmission source of the above-mentioned request for appeal for participation, in the registration management database 17. Then, the participant management unit 142 generates appeal-for-participation information that includes the private information of the person who has made the request for appeal for participation, and transmits the generated appeal-for-participation information to the address registered, in association with the registration number of the private information of the viewer indicated by the above-mentioned selection result, in the viewer management database 133.

Here, when the address to which the appeal-for-participation information is to be transmitted is an IP address, then the appeal-for-participation information is transmitted through the IP network interface unit 11 and the IP network 81. On the other hand, when the address to which the appeal-for-participation information is to be transmitted is the telephone number, then, the appeal-for-participation information is transmitted through the telephone network interface unit 12 and the telephone network 82.

Receiving the appeal-for-participation information from the content distribution/multi-user talking service center 1, the terminal 4, 5 makes the operator select whether he or she accepts the appeal, which is made by the person specified by the appeal-for-participation information in question, for participation in multi-user talking. Then, the selection result is transmitted to the content distribution/multi-user talking service center 1 (S1706). Here, when the terminal that has received the appeal-for-participation information is the receiving terminal 5, then, also the telephone number of the portable telephone 7 used by the operator of the receiving terminal 5 is transmitted together with the selection result to the content distribution/multi-user talking service center 1.

The participant management unit 12 of the content distribution/multi-user talking service center 1 receives the selection result from the terminal 4, 5 that has transmitted the above-mentioned appeal-for-participation information. When the selection result shows acceptance of the appeal for participation, the participant management unit 12, then, the participant management unit 12 registers the address of the terminal 4, 5 that has transmitted the appeal-for-participation information, and the registration number registered in association with that address in the registration management database 17, into the participant management database 143, associating these items with the channel number "X". At that time, when the terminal that has transmitted the appeal-for-participation information is the receiving terminal 5, then, the telephone number of the portable telephone 7 received together with the above-mentioned selection result is registered also.

Thereafter, the multi-user talking service is provided to the terminal 4, 5 that has accepted the appeal for participation, according to the manner described above referring to FIGS. 15 and 16. Namely, when the terminal that has accepted the appeal for participation is an IP terminal 4, then, the processing of S1505–S1507 shown in FIG. 15 is performed between the IP terminal 4 in question and the content distribution/multi-user talking service center 1. Further, when the terminal that has accepted the appeal for participation is the receiving terminal 5, then, the processing of S1606–S1610 shown in FIG. 16 is performed between the portable telephone 7 used by the operator of the receiving terminal 5 in question, the multi-user talking relay apparatus 2, and the content distribution/multi-user talking service center 1.

Next, will be described the menu screens that are each displayed on the display unit connected to a terminal 4, 5 and used by the operator of the terminal 4, 5 in question for giving various instructions such as a request for viewing a content, a request for participation in multi-user talking, and a request for appeal for participation in multi-user talking.

Figure 18A:
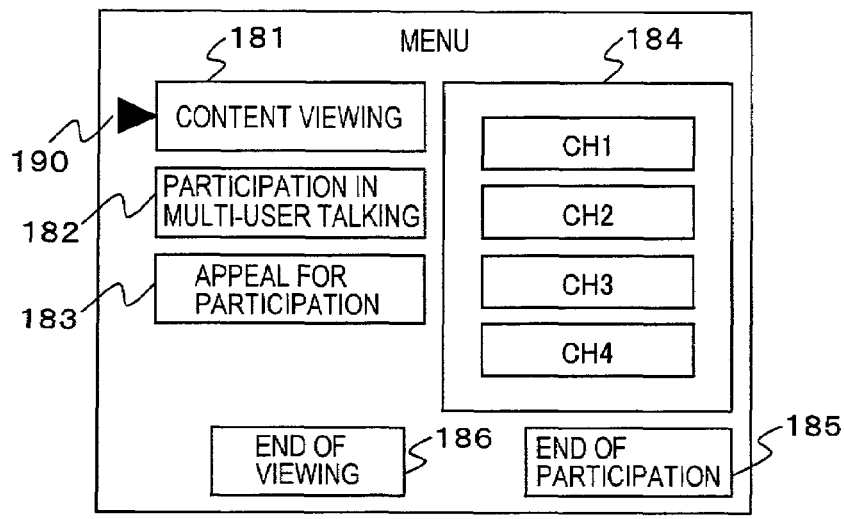
FIGS. 18A to 18C are views showing examples of menu screens displayed on a display unit connected to a terminal 4 or 5 shown in FIG. 1 for an operator to give various instructions.
Figure 18B:
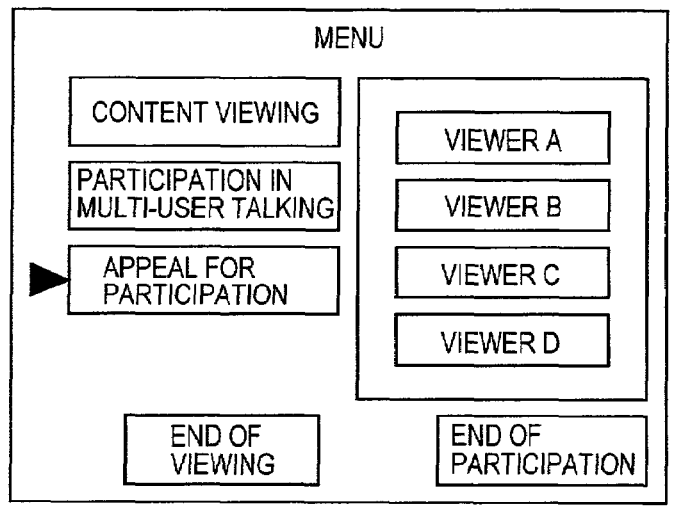
Figure 18C:
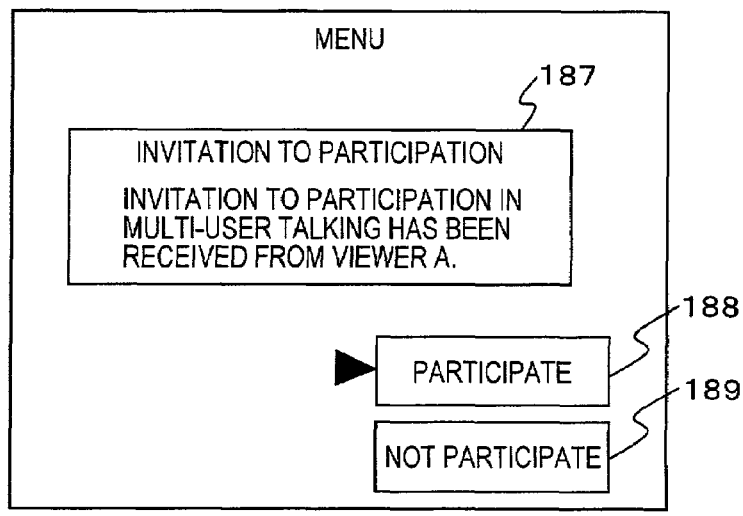

FIGS. 18A to 18C are views showing examples of the menu screens displayed on the display unit connected to a terminal 4, 5 and used by the operator for giving various instructions.

Here, the menu screens shown in FIGS. 18(a) and 18(b) are ones for the operator of the terminal 4, 5 to give instructions of a request for viewing a content, a request for participation in multi-user talking, and a request for appeal for participation. When the operator inputs an instruction to display a menu through the input device such as a mouse, a keyboard, or a console panel, then, the instruction receiving unit 42, 53 of the terminal 4, 5 controls the display processing unit 43, 55 to display the menu on the display unit, using on-screen display or the like.

The operator can move a cursor 190 using the input device, to select any item 181–183 of request for viewing a content, request for participation in multi-user talking, or request for appeal for participation in multi-user talking. Here, it is favorable that the item 182 of request for participation in multi-user talking can be selected only in a state that the item 181 of request for viewing a content has been selected and the terminal 4, 5 is receiving the content in question. Further, it is favorable that the item 183 of request for appeal for participation in multi-user talking can be selected only in a state that the item 182 of request for participation in multi-user talking has been selected and the operator of the terminal 4, 5 is enjoying the multi-user talking service.

Further, the area 184 is a sub-menu for the item selected by the cursor 190. When, as shown in FIG. 18A, the item 181 of request for viewing a content is selected, channel numbers (which have been stored in advance) of contents that the content distribution/multi-user talking service center 1 can distribute are displayed in the area 184. When the operator selects a channel number that he or she wishes to view, using the input device to move the cursor 190, then, a request for viewing a content, which includes the selected channel number and the identification information of the operator, is transmitted to the content distribution/multi-user talking service center 1. Further, when, as shown in FIG. 18B, the item 183 of request for appeal for participation in multi-user talking is selected, then, a request for appeal for participation, which includes the channel number "X" of the content under viewing, is transmitted to the content distribution/multi-user talking service center 1. Then, the viewers of the content of the channel number "X", who are specified by appeal-for-participation selection information received from the content distribution/multi-user talking service center 1 as a reply to the request are displayed in the area 184. When the operator selects a viewer to whom he wishes to appeal for participation, using the input device to move the cursor 190, then, the selection result is transmitted to the content distribution/multi-user talking service center 1.

Further, in FIGS. 18(*a*) and 18(*b*), the item 185 is one for ending enjoyment of the multi-user talking service in which the operator participates. When the operator selects the item 185, using the input device to move the cursor 190, then, the instruction receiving unit 42, 53 of the terminal 4, 5 transmits an instruction to end participation, which includes the channel number "X" of the content under viewing, to the content distribution/multi-user talking service center 1 through the IP network interface unit 41 or the telephone network interface unit 51.

When the instruction receiving unit 141 of the content distribution/multi-user talking service center 1 receives the instruction to end participation through the IP network interface unit 11 or the telephone network interface unit 12, then, the instruction receiving unit 141 sends the instruction to end participation and the address of the transmission source of the instruction to end participation in question (an IP address in the case of an IP terminal 4, and the telephone number in the case of the receiving terminal 5) to the participant management unit 142. Receiving these pieces of information, the participant management unit 142 deletes an entry that is registered in association with the content's channel number "X" included in the received instruction to end participation and that includes the address of transmission source of the instruction to end participation, from the participant management database 143. At that time, when the address of the transmission source of the instruction to end participation is the telephone number, then, deletion relay information is transmitted to the multi-user talking relay apparatus 2. The deletion relay information comprises a pair of the content's channel number "X" and the telephone number of the portable telephone 7, which is registered in association with the address of the transmission source in question. Receiving the deletion relay information, the relay information receiving unit 26 of the multi-user talking relay apparatus 2 deletes the telephone number of the portable telephone 7, which is associated with the channel number "X" included in the received deletion relay information, from the relay information database 25.

Further, in FIGS. 18(*a*) and 18(*b*), the item 186 is one for ending enjoyment of the distribution service of the content under viewing. When the operator selects the item 186, using the input device to move the cursor 190, then, the instruction receiving unit 42, 53 of the terminal 4, 5 transmits an instruction to end viewing, which includes the channel number "X" of the content under viewing, to the content distribution/multi-user talking service center 1 through the IP network interface unit 41 or the telephone network interface unit 51.

When the instruction receiving unit 131 of the content distribution/multi-user talking service center 1 receives the instruction to end viewing, through the IP network interface unit 11 or the telephone network interface unit 12, then, the instruction receiving unit 131 sends the instruction to end viewing and the address of the transmission source of the instruction to end viewing (an IP address in the case of an IP terminal 4 and the telephone number in the case of the receiving terminal 5) to the viewer management unit 132. Receiving these pieces of information, the viewer management unit 132 deletes an entry that is registered in association with the content's channel number "X" included in the received instruction to end viewing and that includes the address of transmission source of the instruction to end viewing, from the viewer management database 133.

Next, the menu screen shown in FIG. 18C is one for an operator of a terminal 4, 5 to instruct to or not to accept an appeal for participation in multi-user talking from another viewer of the same content. When the instruction receiving unit 42, 53 of the terminal 4, 5 receives appeal-for-participation information from the content distribution/multi-user talking service center 1, then, the instruction receiving unit 42, 53 controls the display processing unit 43, 55 to display the information on the display unit, using on-screen display for example.

Here, the area 187 displays information on the viewer specified by the appeal-for-participation information received from the content distribution/multi-user talking service center 1. Further, the items 188 and 189 are ones for selecting whether to accept or not to accept the appeal for participation for multi-user talking from the viewer displayed in the area 187. When the operator selects either item 188, 189 using the input device to move the cursor 190, then, the selection result is transmitted to the content distribution/multi-user talking service center 1.

Hereinabove, one embodiment of the present invention has been described.

Only when an address of a terminal that has transmitted a request for participation in multi-user talking is registered in the viewer management database 133, the content distribution/multi-user talking service center 1 of the present embodiment registers the address in question into the participant management database 143, associating the address with the content's channel number that is registered in association with the address in the viewer management database 133. Then, with respect to each channel number, the multi-user talking control unit 14 of the content distribution/multi-user talking service center 1 synthesizes respective pieces of talking data from addresses registered in the participant management database 143 being associated with the channel number in question, to generate multi-user talking data, and transmits the generated multi-user talking data to each of the above-mentioned addresses. Thus, according to the present embodiment, it is possible to provide a multi-user service among operators of terminals that enjoy a distribution service of the same content, only to persons who desire the multi-user talking service in question.

Further, when the content distribution/multi-user talking service center 1 of the present embodiment receives a request for appeal for participation in multi-user talking from a terminal of an operator who participates in the multi-user talking, then, it is investigated whether the address of the terminal that has transmitted the request for appeal for participation in question is registered in the participant management database 143. When the address is registered, then, appeal for participation in the multi-user talking is transmitted to addresses other than ones that are registered in the participant management database 143 being associated with the channel number registered in association with the above-mentioned address in the participant management database 143, among addresses that are registered in the viewer management database 133 being associated with the above-mentioned the channel number. Then, addresses of terminals that give answers of accepting the appeal for participation are registered into the participant management database 143, each being associated with the above-mentioned channel number. Thus, according to the present embodiment, an operator who participates in multi-user talking can appeal for participation in the multi-user talking, to persons who are viewers of the content viewed by the operator and who is not participating in the multi-user talking. By this, it is possible to enjoy a content provided by the content distribution/multi-user talking service center 1, talking about the same content with more participants in multi-user talking.

Further, in the present embodiment, there are provided the content relay 3 for relaying data between the IP network 81 and the CATV network 83 and the multi-user talking relay 3 for relaying data between the IP network 81 and the telephone network 82.

Here, the content relay 2 obtains IP packets addressed to itself from the IP network 81, assembles the received IP packets to restore a content, and transmits the content onto the CATV network 83. Further, the multi-user talking relay 2 assembles IP packets addressed to itself from the IP network 81 to restore multi-user talking data, transmits the restored multi-user talking data to a channel on the telephone network 82, which is specified by a telephone number informed from the content distribution/multi-user talking service center 1, and converts talking data received from the above-mentioned channel into IP packets, to transmits the IP packets to the content distribution/multi-user talking service center 1.

By this, the receiving terminal 5, which does not have an interface with the IP network 81, can receive a content that the content distribution/multi-user talking service center 1 has distributed onto the IP network 81, through the CATV network 82, by transmitting a request for viewing the content to the content distribution/multi-user talking service center 1 through the telephone network 82. Further, when the receiving terminal 5 transmits a request for participation, which includes the telephone number of the portable telephone 7, to the content distribution/multi-user talking service center 1 through the telephone network 82, the portable telephone 7 can receive multi-user talking data, which has been distributed onto the IP network 81 by the content distribution/multi-user talking service center 1, through the telephone network 82. Further, the portable telephone 7 can transmits talking data, which is transmitted to the multi-user talking relay 2 through the telephone network 82, to the content distribution/multi-user talking service center 1 through the IP network 81. Thus, according to the present embodiment, it is possible to provide a content distribution service and a multi-user talking service among viewers of the same content to terminals having different interfaces.

The present invention is not limited to the above-described embodiment, and can be variously modified within the gist of the invention.

For example, the above embodiment has been described taking the example in which the content distribution/multi-user talking service center 1 is implemented in one apparatus. However, the content distribution/multi-user talking service center 1 may be implemented by a plurality of apparatuses. For example, the content distribution control unit 13 and the multi-user talking control unit 14 may be implemented respectively by separate apparatuses. Further, the authentication unit 15, the accounting unit 16 and the registration management database 17 may be implemented on a different apparatus from the other components.

Further, in the above-described embodiment, the content relay apparatus 3 is provided for relaying data between the IP network 81 and the CATV network 83, and the receiving terminal 5 receives content through the CATV network 83. However, the present invention is not limited to this. For example, in place of the content relay apparatus 3, may be provided a content relay that performs wireless broadcasting of a television broadcast signal expressing a content obtained from the IP network 81, and the receiving terminal 5 may receive this television broadcast signal.

Further, in the above-described embodiment, are exemplified the receiving terminal that has the interface with the CATV network 83 and the portable telephone 7 that has the interface with the telephone network 82, as terminals having different interfaces from the interface (the IP network interface unit 11) used by the content distribution/multi-user talking service center 1 for providing a content distribution service and a multi-user talking service. However, the present invention is not limited to this. Another terminal can enjoy the content distribution service and the multi-user talking service provided by the content distribution/multi-user talking service center 1, by providing a relay between a first network connected to the content distribution/multi-user talking service center and a second network connected to the above-mentioned terminal, for relaying content data between the first network and the second network as described above, and by providing another relay for relaying multi-user talking data from the first network to the second network and for relaying talking data from the second network to the first network.

As described above, according to the present invention, it is possible to provide a multi-user talking service only to viewers who wishes to enjoy the same content in a large number of people, among viewers using a content distribution service to view the same content.

What is claimed is:

1. A multi-user talking system for providing a multi-user talking service among viewers of a content, comprising:
a content distribution apparatus and a multi-user talking control apparatus, each apparatus being connected to terminals of viewers through a network;
wherein said content distribution apparatus comprises:
request-for-viewing receiving means for receiving the request for viewing said content from a terminal of a viewer;
viewer management means for managing the request for viewing received by said request-for-viewing receiving means, associating said request with a transmission source address of said request for viewing; and
content distribution means for distributing said content to a transmission source address managed by said viewer management means, through said network; and
wherein said multi-user talking control apparatus comprises:
request-for-participation receiving means for receiving a request for participation in multi-user talking, from a terminal of a viewer;
participant management means that manages a transmission source address of a request for participation received by said request-for-participation receiving means, when said transmission source address is managed by said viewer management means;
mixing means that receives, through said network, respective pieces of talking data from terminals of viewers who have transmission source addresses managed by said participant management means, and mixes said pieces of talking data received to generate multi-user talking data; and
multi-user talking data distribution means for distributing the multi-user talking data generated by said mixing means to transmission source addresses managed by said participant management means, through said network; and
wherein said network is an IP network;
wherein said content distribution means converts said content into IP packets, adds transmission source addresses managed by said viewer management means to a header of each IP packet, and multicasts the IP packets onto said IP network; and
wherein said multi-user talking data distribution means converts the multi-user talking data generated by said mixing means into IP packets, adds transmission source addresses managed by said participant management means to a header of each IP packet, and multicasts the IP packets onto said P network;
wherein said multi-user talking system further comprises:
a first relay for relaying data between said IP network and television broadcast, said first relay having means for assembling P packets addressed to the first relay itself to restore a content and for broadcasting the restored content; and
a second relay for relaying data between said IP network and a telephone network, said second relay having means for assembling IP packets addressed to the second relay itself to restore multi-user talking data and for transmitting the restored multi-user talking data to a channel specified by a telephone number informed from said multi-user talking control apparatus, and means for converting talking data received by said channel into IP packets and for transmitting the IP packets to said multi-user talking control apparatus;
wherein said request-for-viewing receiving means comprises:
means for receiving a request for viewing from a viewer's terminal provided with an interface with said IP network through said IP network; and
means for receiving a request for viewing from a viewer's terminal provided with an interface with said telephone network through said telephone network;
wherein said viewer management means sets a transmission source address associated with a request for viewing received by said request-for-viewing receiving means, to an IP address of a transmission source of said request for viewing, when said request-for-viewing receiving means receives said request for viewing through said IP network, and to a telephone number of the transmission source of said request for viewing, when said request-for-viewing receiving means receives said request for viewing through said telephone network;
wherein said content distribution means uses an P address of said first relay, as a transmission source address added to a header of each IP packet of said content, in place of a telephone number included in the transmission source addresses managed by said viewer management means, when such a telephone number exists;
wherein said request-for-participation receiving means comprises:
means for receiving a request for participation from a viewer's terminal provided with an interface with said IP network through said IP network; and
means for receiving a request for participation including a telephone number from a viewer's terminal provided with an interface with said telephone network through said telephone network;
wherein said participant management means sets a transmission source address associated with a request for participation received by said request-for-participation receiving means, to an IP address of a transmission source of said request for participation, when said request-for-participation receiving means receives said request for participation through said IP network, and to a telephone number of the transmission source of said request for participation, when said request-for-participation receiving means receives said request for participation through said telephone network;
wherein said mixing means receives pieces of talking data through said network from viewer's terminals each having an IP address managed by said participant management means and from said second relay, when a telephone number is included in transmission source addresses of requests for participation managed by said participant management means, and mixes the received pieces of talking data to generate multi-user talking data;
wherein said multi-user talking data distribution means uses an IP address of said second relay, as an address added to a header of each IP packet of the multi-user talking data generated by said mixing means, in place of a telephone number included in the transmission source addresses of the requests for participation managed by said participant management means, when such a telephone number exists; and
wherein said multi-user talking control apparatus further comprises a number informing means for informing said second relay of a telephone number included in a request for participation, when a transmission source address of said request for participation received by said request-for-participation means is said telephone number.

2. The multi-user talking system according to claim 1, wherein:
said viewer's terminal provided with the interface with said telephone network comprises:
receiving means for receiving said content broadcast by the television broadcast and for outputting the received content to a television broadcast display apparatus;
request-for-viewing transmitting means for transmitting a request, which includes a telephone number of a telephone set by an operator, for viewing said content, to said content distribution apparatus through said telephone network, before said receiving means receives said content; and
request-for-participation transmitting means for receiving a request for participation in multi-user talking from the operator while said receiving means is receiving said content, and for transmitting the received request for participation to said multi-user talking control apparatus through said telephone network.

3. The multi-user talking system according to claim 1, wherein: said viewer's terminal provided with the interface with said IP network comprises:
request-for-viewing transmitting means for transmitting a request for viewing said content, to said content distribution apparatus through said IP network;
content display means for assembling IP packets addressed to said content display means itself to restore said content, and for displaying the restored content on a display unit;
request-for-participation transmitting means for receiving a request for participation in multi-user talking from an operator while said content display means is displaying said content on said display unit, and for transmitting the received request for participation to said multi-user talking control apparatus through said IP network;
multi-user talking output means for assembling IP packets addressed to said multi-user talking output means itself to restore said multi-user talking data, and for outputting sound conforming to the restored multi-user talking data, to a sound output apparatus; and talking data transmitting means for converting talking data conforming to sound inputted through a sound input apparatus into IP packets, and for adding an IP address of said multi-user talking control apparatus to a header of each IP packet, to transmits the IP packets onto said IP network.

4. A method of multi-user talking, which uses a computer for providing a multi-user talking service among viewers of a content, comprising:
a request-for-viewing receiving step of receiving a request for viewing said content from a terminal of a viewer;
a viewer management step of managing the request for viewing received in said request-for-viewing receiving step, associating said request with a transmission source address of said request for viewing;
a content distribution step of distributing said content to a transmission source address managed in said viewer management step;
a request-for-participation receiving step of receiving a request for participation in multi-user talking, from a terminal of a viewer;
a participant management step of managing a transmission source address of a request for participation received in said request-for-participation receiving step, when said transmission source address is managed in said viewer management step;
a mixing step of receiving respective pieces of talking data from terminals of viewers who have transmission source addresses managed in said participant management step, and mixing said pieces of talking data received to generate multi-user talking data; and
a multi-user talking data distribution step of distributing the multi-user talking data generated in said mixing step to transmission source addresses managed in said participant management step;
wherein in said request-for-viewing receiving step, said request for viewing is received from a viewer's terminal provided with an interface with an IP network, through said IP network, and received from a viewer's terminal provided with an interface with a telephone network, through said telephone network;
wherein in said viewer management step, a transmission source address that is associated with a request for viewing received in said request-for-viewing receiving step is set to an IP address of a transmission source address of said request for viewing, when said request for viewing is received through said IP network, and to a telephone number of the transmission source of said request for viewing, when said request for viewing is received through said telephone network;
wherein in said content distribution step, said content is converted to IP packets, and transmission source addresses managed in said viewer management step are added to a header of each IP packet, to multicast the IP packets onto said IP network, and, when a telephone number is included in the transmission source addresses managed in said viewer management step, then, an IP address of a first relay, which assembles IP packets addressed to the first relay itself to restore a content and broadcasts the content, is used in place of said telephone number as a transmission source address added to a header of each IP packet of said content;
wherein in said request-for-participation receiving step, a request for participation is received from a viewer's terminal provided with an interface with said IP network, through said IP network, and a request for participation including a telephone number is received from a viewer's terminal provided with not an interface with said IP network but an interface with said telephone network, through said telephone network;
wherein in said participant management step, a transmission source address of a request for participation received in said request-for-participation receiving step is set to an IP address of a transmission source of said request for participation, when said request for participation is received through said IP network, and to a telephone number of the transmission source of said request for participation, when said request for participation is received through said telephone network;
wherein in said mixing step, pieces of talking data are received through said IP network from viewer's terminals each having an IP address managed in said participant management step, and the received pieces of talking data are mixed to generate multi-user talking data;
wherein in said mixing step, when a telephone number is included in transmission source addresses managed in said participant management step, pieces of talking data are received from viewer's terminals each having an IP address managed in said participant management step and from a second relay, and said pieces of talking data are assembled to generate multi-user talking data, wherein said second relay assembles IP packets addressed to the second relay itself to restore multi-user talking data and to transmit the restored multi-user talking data to a channel specified by a telephone number informed from said computer, and converts talking data received from said channel to IP packets to transmits the IP packets to said computer;

wherein in said multi-user talking data distribution step, the multi-user talking data generated in said mixing step is converted to IP packets, and the transmission source addresses managed in said participant management step are added to a header of each IP packet, to multicast the IP packets onto said IP network; and wherein in said multi-user talking data distribution step, when a telephone number is included in the transmission source addresses managed in said participant management step, an IP address of said second relay is used in place of said telephone number, as an address added to a header of each IP packet of said multi-user talking data, and, when a transmission source address of a request for participation is said telephone number, then said telephone number is sent to said second relay.

* * * * *